(12) United States Patent
Akiyama

(10) Patent No.: US 10,491,321 B2
(45) Date of Patent: *Nov. 26, 2019

(54) OPTICAL TRANSPORT APPARATUS, OPTICAL DEMULTIPLEXER, AND METHOD OF CONTROLLING OPTICAL DEMULTIPLEXING

(71) Applicants: FUJITSU LIMITED, Kawasaki-shi, Kanagawa (JP); Photonics Electronics Technology Research Association, Bunkyo-ku, Tokyo (JP)

(72) Inventor: Tomoyuki Akiyama, Yokohama (JP)

(73) Assignees: FUJITSU LIMITED, Kawasaki (JP); PHOTONICS ELECTRONICS TECHNOLOGY RESEARCH ASSOCIATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/254,983

(22) Filed: Jan. 23, 2019

(65) Prior Publication Data
US 2019/0245642 A1 Aug. 8, 2019

(30) Foreign Application Priority Data

Feb. 5, 2018 (JP) ................................. 2018-018559

(51) Int. Cl.
*H04J 14/02* (2006.01)
*G02B 6/12* (2006.01)
(Continued)

(52) U.S. Cl.
CPC ...... *H04J 14/0209* (2013.01); *G02B 6/12007* (2013.01); *G02B 6/2935* (2013.01); *H04J 14/0257* (2013.01); *H04B 10/07* (2013.01)

(58) Field of Classification Search
CPC .............. H04J 14/0209; H04J 14/0257; G02B 6/2935; G02B 6/12007; H04B 10/07
(Continued)

(56) References Cited

U.S. PATENT DOCUMENTS 5,852,505 A * 12/1998 Li ..................... G02B 6/12007
398/58
6,118,564 A * 9/2000 Ooi ..................... H04Q 11/0001
398/1

(Continued)

FOREIGN PATENT DOCUMENTS

| JP | 63-46022 | 2/1988 |
| JP | 2011-154332 | 8/2011 |
| JP | 2014-182259 | 9/2014 |

OTHER PUBLICATIONS

Haga et al, An Integrated 1×4 High speed Optical Switch and Its Applications to a Time Demultiplexer, Feb. 1985, Journal of Lightwave Technology, pp. 116-120. (Year: 1985).*

(Continued)

*Primary Examiner* — Dibson J Sanchez
(74) *Attorney, Agent, or Firm* — Staas & Halsey LLP

(57) ABSTRACT

An optical demultiplexer has at least one unit circuit formed by three AMZs having a same arm length difference and cascaded in a tree structure in which two output ports of the 1st AMZ are connected to the 2nd AMZ and the 3rd AMZ, respectively, wherein the unit circuit has first and second monitors connected to the first and second output ports of the 2nd AMZ, and third and fourth monitors connected to the first and second output ports of the 3rd AMZ, a first control circuit controlling the transmissivity of the 1st AMZ so as to increase the monitoring result of the second and fourth monitors, a second control circuit controlling the transmissivity of the 2nd AMZ to decrease the monitoring result of the first monitor, and a third control circuit controlling the
(Continued)

transmissivity of the 3rd AMZ to decrease the monitoring result of the third monitor.

9 Claims, 21 Drawing Sheets

(51) Int. Cl.
  *G02B 6/293* (2006.01)
  *H04B 10/07* (2013.01)
(58) Field of Classification Search
  USPC .......................................... 398/9–38, 43–103
  See application file for complete search history.

(56) References Cited

U.S. PATENT DOCUMENTS

| | | | | |
|---|---|---|---|---|
| 6,185,345 B1* | 2/2001 | Singh | G02B 6/12007 | 385/14 |
| 6,208,780 B1* | 3/2001 | Li | G02F 1/225 | 385/15 |
| 6,263,126 B1* | 7/2001 | Cao | G02B 6/29349 | 385/24 |
| 6,349,158 B1* | 2/2002 | Yang | G02B 6/29355 | 385/24 |
| 6,459,829 B1* | 10/2002 | Yamauchi | G02B 6/12011 | 385/11 |
| 6,560,381 B2* | 5/2003 | Hatayama | G02B 6/12007 | 359/337.2 |
| 6,804,430 B2* | 10/2004 | Ooyama | G02B 6/12007 | 385/24 |
| 6,909,531 B2* | 6/2005 | Frignac | G02B 6/29358 | 359/279 |
| 6,947,631 B2* | 9/2005 | Arai | G02B 6/12004 | 385/15 |
| 7,324,713 B2* | 1/2008 | Jang | H04B 10/677 | 359/237 |
| 8,699,013 B2* | 4/2014 | Ogawa | G01M 11/331 | 356/451 |
| 9,485,552 B1* | 11/2016 | Dupuis | H04Q 11/0005 | |
| 9,780,903 B2* | 10/2017 | Okayama | H04J 14/02 | |
| 2001/0024543 A1* | 9/2001 | Ahmadvand | G02B 6/29355 | 385/24 |
| 2001/0048786 A1* | 12/2001 | Arai | G02B 6/12007 | 385/24 |
| 2002/0106147 A1* | 8/2002 | Kitoh | G02B 6/12007 | 385/24 |
| 2002/0150329 A1* | 10/2002 | Ahn | G02B 6/305 | 385/24 |
| 2002/0154850 A1* | 10/2002 | Xie | G02B 6/12007 | 385/15 |
| 2002/0176660 A1* | 11/2002 | Saito | G02B 6/12007 | 385/24 |
| 2002/0181857 A1* | 12/2002 | Komatsu | G02B 6/12 | 385/24 |
| 2003/0021516 A1* | 1/2003 | Pafchek | G02B 6/12007 | 385/14 |
| 2003/0063845 A1* | 4/2003 | Michal | G02B 6/264 | 385/24 |
| 2003/0081919 A1* | 5/2003 | Mukai | G02B 6/12004 | 385/122 |
| 2003/0152385 A1* | 8/2003 | Eldada | G02B 6/12004 | 398/34 |
| 2004/0086220 A1* | 5/2004 | Mino | G02F 1/31 | 385/22 |
| 2004/0120640 A1* | 6/2004 | Hatayama | G02B 6/29355 | 385/27 |
| 2004/0136646 A1* | 7/2004 | Shahar | G02B 6/125 | 385/24 |
| 2004/0151509 A1* | 8/2004 | Bulow | G02B 6/12007 | 398/147 |
| 2004/0160665 A1* | 8/2004 | Nakamoto | G02B 6/29355 | 359/337.2 |
| 2005/0276539 A1* | 12/2005 | Fukuda | G02B 6/29353 | 385/24 |
| 2007/0104409 A1* | 5/2007 | Nara | G02B 6/12007 | 385/14 |
| 2008/0175602 A1* | 7/2008 | Mitani | H04B 10/66 | 398/202 |
| 2009/0022454 A1* | 1/2009 | Chen | G02B 6/12007 | 385/24 |
| 2009/0028580 A1* | 1/2009 | Ojima | H04B 10/677 | 398/202 |
| 2009/0034967 A1* | 2/2009 | Tao | H04B 10/677 | 398/33 |
| 2009/0097867 A1* | 4/2009 | Yoneyama | H04B 10/677 | 398/212 |
| 2009/0110393 A1* | 4/2009 | Nara | G02B 6/12007 | 398/45 |
| 2009/0110401 A1* | 4/2009 | Sakharov | H04J 14/0201 | 398/79 |
| 2009/0169211 A1* | 7/2009 | Chen | G02B 6/29355 | 398/79 |
| 2009/0245785 A1* | 10/2009 | Asano | H04B 10/677 | 398/25 |
| 2009/0245794 A1* | 10/2009 | Sakharov | H04J 14/02 | 398/79 |
| 2010/0284019 A1* | 11/2010 | Fukuda | B82Y 20/00 | 356/477 |
| 2010/0329679 A1* | 12/2010 | Little | H04J 14/02 | 398/79 |
| 2011/0075149 A1* | 3/2011 | Mure | H04B 10/677 | 356/450 |
| 2012/0281234 A1* | 11/2012 | Matsui | G02B 6/29355 | 356/478 |
| 2013/0241756 A1* | 9/2013 | Sato | G02F 1/2255 | 341/137 |
| 2014/0299743 A1* | 10/2014 | Miller | G02B 27/145 | 250/204 |
| 2015/0263819 A1* | 9/2015 | Fincato | H04J 14/02 | 398/43 |
| 2017/0293200 A1* | 10/2017 | Jiang | G02F 1/3136 | |
| 2019/0097732 A1* | 3/2019 | Akiyama | H04B 10/572 | |

OTHER PUBLICATIONS

Hai et al, A Thermally Tunable 1×4 Channel Wavelength Demultiplexer, Nov. 2015, Photonics, pp. 1065-1080. (Year: 2015).*
Espacenet English abstract corresponding to Japanese Patent Publication No. 2011-154332, published Aug. 11, 2011.
Espacenet English abstract corresponding to Japanese Patent Publication No. 63-46022, published Feb. 26, 1988.
Japanese Platform for Patent Information English abstract corresponding to Japanese Patent Publication No. 2014-182259, published Sep. 29, 2014.

* cited by examiner

BEFORE CORRECTION

HALFWAY THROUGH CORRECTION

AFTER CORRECTION

STEP 1

STEP 3

OPTICAL TRANSPORT APPARATUS, OPTICAL DEMULTIPLEXER, AND METHOD OF CONTROLLING OPTICAL DEMULTIPLEXING

CROSS-REFERENCE TO RELATED APPLICATIONS

This application is based upon and claims priority to earlier filed Japanese Patent Application No. 2018-018559 filed Feb. 5, 2018, the entire contents of which are incorporated herein by reference.

FIELD

The present invention relates to an optical transport apparatus, an optical demultiplexer, and a method of controlling optical demultiplexing.

BACKGROUND

Due to global spread of the internet and an increase in "things" connected to the internet, the amount of data traffic has dramatically increased, and improvement of transmission capacity and transmission speed is required. The performance of an information processing system is determined by the processing speed of the computing device and the transmission speed of a mutually coupling medium. Regarding the computing device, research and studies are continuously made on scaling or miniaturization of silicon integrated circuits. Following the scaling of IC devices, scaling of the mutually coupled medium and improvement of operation speed are also required. In the future, further downsizing and high-speed operation will be desired for the entirety of a transmission system.

For downsizing and speedup of systems, mutual coupling in optical transmission using silicon integrated circuits and fiber optic cables is attracting attention. One solution for increasing the number of channels per fiber is a technique of wavelength division multiplexing (WDM). At a receiving end, a WDM signal is demultiplexed into light signals with different wavelengths.

An optical demultiplexer in which a plurality of delay-line Mach-Zehnder (MZ) interferometers are cascaded is known. In this architecture, two outputs of the first delay-line MZ interferometer are connected to an input of the second delay-line MZ interferometer and an input of the third delay-line MZ interferometer, respectively. Each of the second and the third delay-line MZ interferometers has half the path length difference of the first delay-line MZ interferometers. See, for example, Patent Document 1 listed below.

An optical demultiplexer in which a plurality of directional optical couplers are cascaded, is also known. See, for example, patent Document 2 listed below. With this architecture, each directional optical coupler has an input port, an output port, and two optical waveguides extending between the input port and the output port. The relative effective path lengths of the two optical waveguides are regulated such that the direct current component of the optical signal detected from the output of the optical demultiplexer becomes the maximum.

FIG. 1 illustrates a conventional optical demultiplexer for demultiplexing a WDM signal. A received WDM signal is input to the optical demultiplexer in which a plurality of asymmetric MZ interferometers (which may be referred to as "AMZs") are cascaded in a tree structure. In this example, a WDM signal with four signal components of wavelengths $\lambda 1$ to $\lambda 4$ that are multiplexed is input to the optical demultiplexer.

The path length difference of the first stage $AMZ_A$ is $2\Delta L$, and the path length difference of the second stage $AMZ_B$ and $AMZ_C$ is $\Delta L$. The WDM signal is separated into two transmission components whose spectra are inverted relative to each other, at two output ports of the $AMZ_A$. The $AMZ_A$ is designed such that the upper arm transmits the lights of $\lambda 1$ and $\lambda 3$ and the lower arm transmits the lights of $\lambda 2$ and $\lambda 4$. The separated transmission spectra are input to the second stage $AMZ_B$ and $AMZ_C$, respectively. In each AMZ of the second stage, the inputted spectrum is again separated into two transmission components whose spectra are inverted relative to each other. The period of the transmission spectrum is inversely proportional to the arm length difference. The period of the transmission spectra separated by the second stage $AMZ_B$ and $AMB_C$ is twice as long as that of the transmission spectra separated by the first stage $AMB_A$. With this structure, signals of four wavelengths are separated at and output from the total of four output ports of the second stage AMZs.

The spectrum of the light transmitted from the input port to each of the output ports of the optical demultiplexer is determined by the product of the transmission spectra of the AMZs existing between the input port and the output port. By finely tuning the effective arm length difference of each AMZ at the order of the wavelength to bring the peak wavelength of the transmission spectrum to an appropriate wavelength for the input WDM signal, a spectrum from which a light component of a target wavelength can be separated is obtained at the output port.

LIST OF DOCUMENTS

Patent Document 1: Japanese Patent Application Laid-open No. 2014-182259
Patent Document 2: Japanese Patent Application Laid-open NO. 63-46022

SUMMARY

According to an aspect of the invention, an optical transport apparatus used in a wavelength division multiplexing system has an optical demultiplexer that separates a wavelength division multiplexed signal into light components of respective wavelengths, wherein the optical demultiplexer has at least one unit circuit formed by three asymmetric Mach-Zehnder interferometers having a same arm length difference, wherein the unit circuit has a tree structure in which two output ports of a first asymmetric Mach-Zehnder interferometer are connected to a second asymmetric Mach-Zehnder interferometer and a third asymmetric Mach-Zehnder interferometer, respectively, and wherein the unit circuit has a first monitor connected to a first output port of the second asymmetric Mach-Zehnder interferometer, a second monitor connected to a second output port of the second asymmetric Mach-Zehnder interferometer, a third monitor connected to a first output port of the third asymmetric Mach-Zehnder interferometer, a fourth monitor connected to a second output port of the third asymmetric Mach-Zehnder interferometer, a first control circuit that controls a first transmissivity of the first asymmetric Mach-Zehnder interferometer so as to increase a monitoring result acquired from the second monitor and the fourth monitor, a second control circuit that controls a second transmissivity of the second asymmetric Mach-Zehnder interferometer so as to decrease a monitoring result of the first monitor, and a third control circuit that controls a third transmissivity of the third asymmetric Mach-Zehnder interferometer so as to decrease a monitoring result of the third monitor, and wherein the second output port of the second asymmetric Mach-Zehnder interferometer outputs a first transmission spectrum and the second output port of the third asymmetric Mach-Zehnder interferometer outputs a second transmission spectrum.

The object and advantages of the invention will be realized and attained by means of the elements and combinations particularly pointed out in the claims. It is to be understood that both the foregoing general description and the following detailed description are exemplary and explanatory and are not restrictive to the invention as claimed.

DESCRIPTION OF EMBODIMENTS

Figure 1:
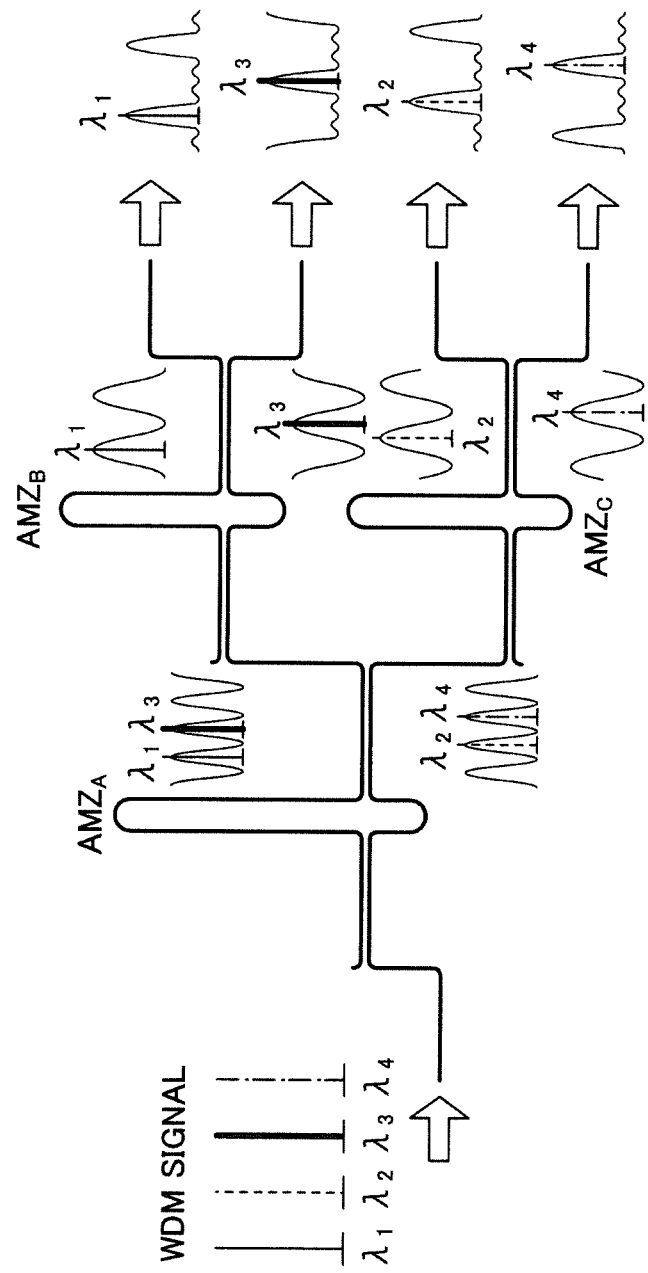
FIG. 1 illustrates a conventional optical demultiplexer.
Figure 2:
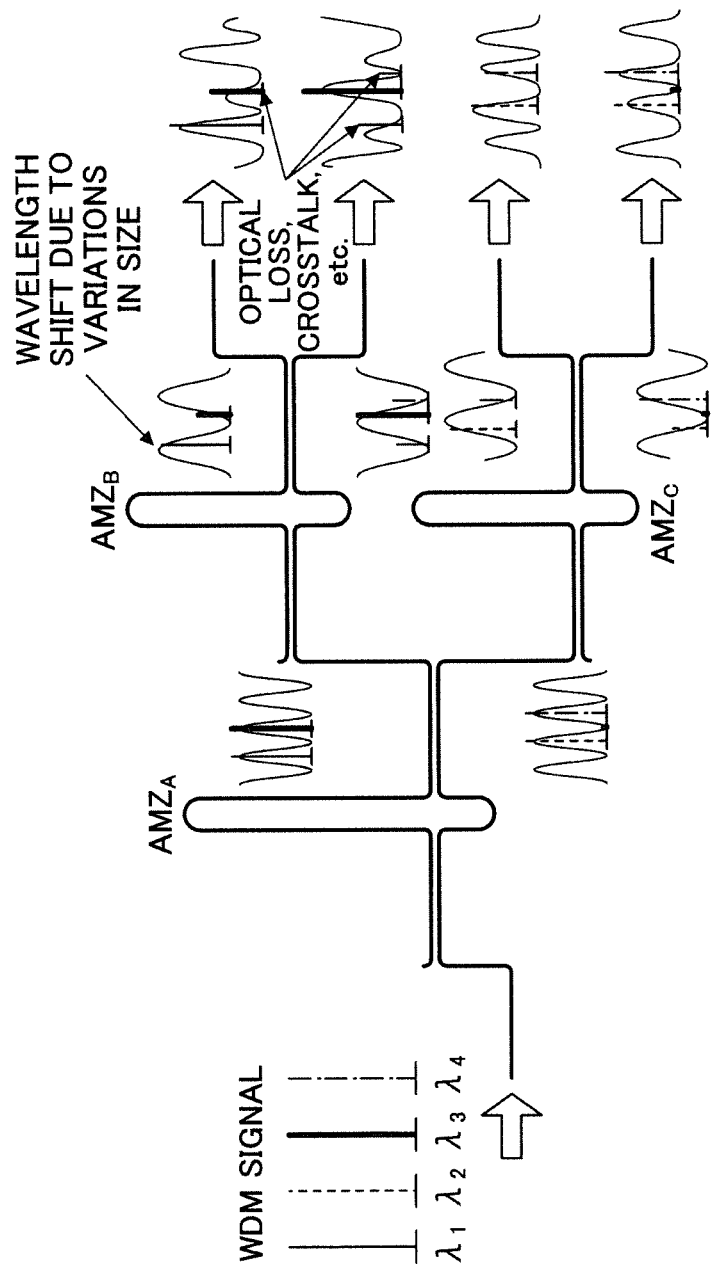
FIG. 2 is a diagram for explaining technical problems arising in the conventional optical demultiplexer.

Prior to describing the embodiments in detail, brief explanation is made of with respect to a technical problem in the conventional configuration found by the inventor, with reference to FIG. 2. The arm length difference of an AMZ is influenced by variations in manufacturing process and variation in refractive index due to temperature change, and it does not necessarily become one as designed. Upon fluctuation of the peak transmission wavelength of each AMZ due to variations in the manufacturing process or refractive index, the transmission spectrum of light deforms at each of the output ports, which results in optical loss and crosstalk as illustrated in FIG. 2. The embodiments provide an optical transport apparatus capable of appropriately demultiplexing a received optical signal into light components of the respective wavelengths, regardless of production tolerance or temperature fluctuation.

<Basic Structure>

Figure 3:
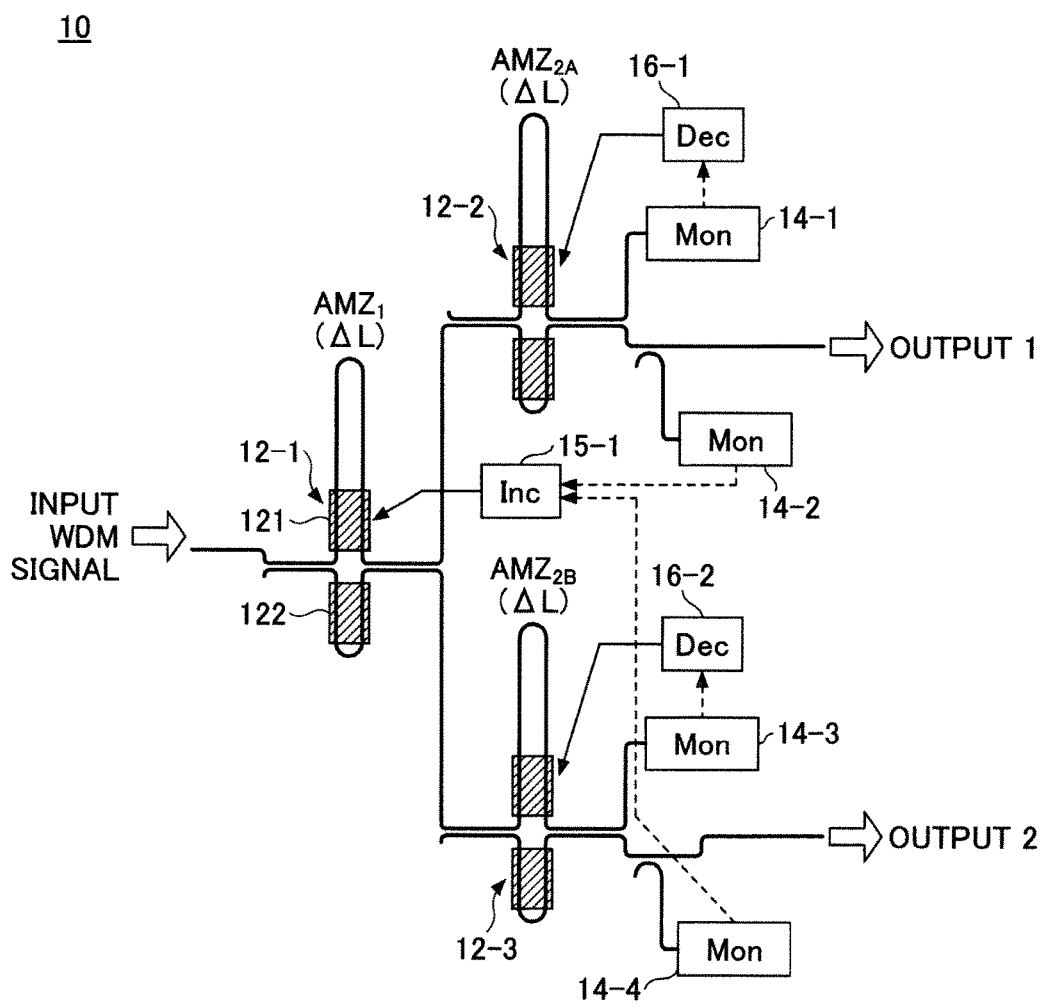
FIG. 3 illustrates a unit circuit used in an optical demultiplexer according an embodiment.

FIG. 3 illustrates a configuration of a unit circuit 10 used in an optical demultiplexer of the embodiment. The optical demultiplexer is applied to, for example, an optical transport apparatus in a WDM fiber-optic network. The unit circuit 10 includes three asymmetric Mach-Zehnder interferometers $AMZ_1$, $AMZ_{2A}$ and $AMZ_{2B}$ (hereinafter collectively referred to as "AMZ" as necessary) that have a same amount of difference $\Delta L$ in the arm lengths. In this specification and claims, "the same" arm length difference means that the difference in the effective arm length as designed is the same, and actual products may contain some tolerance or admissible error, variations in manufacturing processes, and so on.

Each AMZ has an input port and two output ports. The two output ports of $AMZ_1$ are connected to the input of $AMZ_{2A}$ and the input of $AMZ_{2B}$, respectively.

The unit circuit 10 has a first monitor 14-1, a second monitor 14-2, a third monitor 14-3, and a fourth monitor 14-4. These monitors are labelled as "Mon" in the figure. The first monitor 14-1 is connected to one of the two output ports of the $AMZ_{2A}$, and the second monitor 14-2 is provided to the other output port of the $AMZ_{2A}$. The third monitor 14-3 is connected to one of the two output ports of the $AMZ_{2B}$, and the fourth monitor 14-4 is provided to the other output port of the $AMZ_{2B}$.

The output port of the $AMZ_{2A}$ to which the second monitor 14-2 is provided becomes one output port of the unit circuit 10, and the output port of the $AMZ_{2B}$ to which the fourth monitor 14-4 is provided becomes the other output port of the unit circuit 10.

The monitoring results of the second monitor 14-2 and the fourth monitor 14-4 are supplied to a control circuit 15-1, which is labelled as "Inc" in the figure. The monitoring result of the first monitor 14-1 is supplied to the control circuit 16-1, and the monitoring result of the third monitor 14-3 is supplied to the control circuit 16-2. The control circuits 16-1 and 16-2 are labelled as "Dec" in the figure.

The control circuit 15-1 controls the transmission characteristics of the $AMZ_1$ based upon the monitoring results of the second monitor 14-2 and the fourth monitor 14-4. The control circuit 16-1 controls the transmission characteristic of the $AMZ_{2A}$ based upon the monitoring result of the first monitor 14-1. The control circuit 16-2 controls the transmission characteristic of the $AMZ_{2B}$ based upon the monitoring result of the third monitor 14-3.

The transmission characteristics may be controlled by, for example, controlling phase shifters 12-1, 12-2, and 12-3 provided in the $AMZ_1$, $AMZ_{2A}$ and $AMZ_{2B}$, respectively.

The control circuit 15-1 labelled as "Inc" in the figure controls the first phase shifter 12-1 in a direction to increase the power monitored at the second monitor 14-2 and the fourth monitor 14-4.

The control circuit 16-1 labelled as "Dec" in the figure controls the second phase shifter 12-2 in a direction to decrease the power monitored at the first monitor 14-1.

The control circuit 16-2 which is also labelled as "Dec" in the figure, controls the third phase shifter 12-3 in a direction to decrease the power monitored at the third monitor 14-3. In the figure, the control circuit 16-2 is labelled as "Dec".

The unit circuit 10 has and a first output ("OUTPUT 1" in the figure) acquired from a light transmitted through $AMZ_1$ and $AMZ_{2A}$, and a second output ("OUTPUT 2" in the figure) acquired from a light transmitted through $AMZ_1$ and $AMZ_{2B}$, with respect to the inputted WDM signal. The unit circuit 10 of FIG. 3 is configured to separate two wavelengths for the exemplification purpose. The more the number of unit circuits 10 cascaded in a multi-stage tournament tree, the more the number of wavelengths demultiplexed. When the number of stages of the unit-circuit cascade is "m", the number of wavelengths to be demultiplexed is $2^m$. The AMZs used in the same unit circuit 10 are regarded as being of the same stage.

Figure 4:
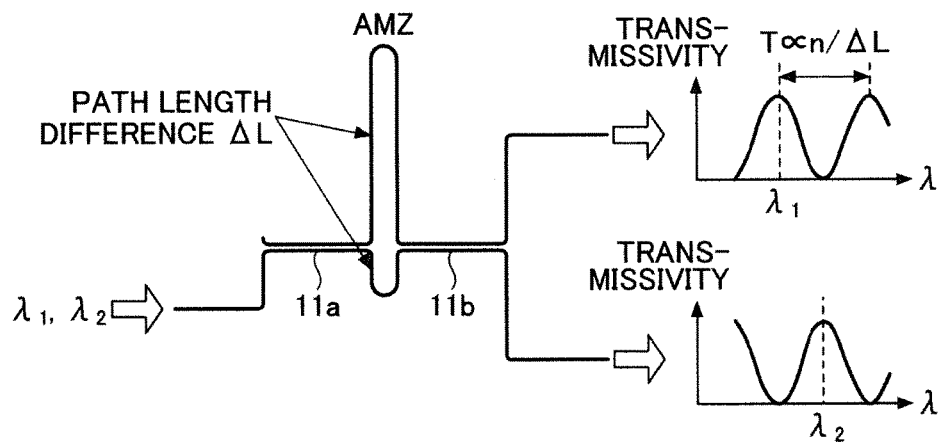
FIG. 4 illustrates an example of an asymmetric Mach-Zehnder interferometer.

FIG. 4 illustrates an example of an asymmetric Mach-Zehnder interferometer (AMZ). The AMZ has a 3-dB coupler 11a that splits the input light, two optical waveguides that guide the light components split by the 3 dB coupler 11a, and a 3-dB coupler 11b that multiplexes the light components travelling through the optical waveguides. The arm lengths of the two optical waveguides are different by $\Delta L$.

The transmission spectrum of the AMZ has a period T inversely proportional to the arm length difference $\Delta L$. More specifically, the transmission spectrum of the AMZ is a raised cosine spectrum of period T inversely proportional to $\Delta L/n$, where "n" denotes the refractive index of the guided mode.

For example, when a WDM signal in which light signals of wavelengths $\lambda 1$ and $\lambda 2$ are multiplexed is incident on the AMZ, the WDM signal is demultiplexed into the light components of $\lambda 1$ and $\lambda 2$ by means of the arm length difference $\Delta L$. When $\lambda 1$ and $\lambda 2$ are coincident with the center transmission wavelengths of the AMZ, a transmission spectrum having a peak waveform of $\lambda 1$ is output from one output port, and a transmission spectrum having a peak waveform of $\lambda 2$ is output from the other output port of the unit circuit 10.

Referring to FIG. 3, the first transmission spectrum is output ("output 1") from one of the output ports of $AMZ_{2A}$ at which the second monitor 14-2 is provided. In this sense, the second monitor 14-2 functions as a power monitor of the associated output light.

The second transmission spectrum is output ("output 2") from one of the output ports of $AMZ_{2B}$ at which the fourth monitor 14-4 is provided. In this sense, the fourth monitor 14-4 also functions as a power monitor of the associated output light.

When a plurality of unit circuits 10 of FIG. 3 are cascaded in multiple stages, other unit circuits may be connected to the output 1 and the output 2, respectively, of the first unit circuit 10. This multistage configuration will be described later.

The basic concept of the unit circuit 10 of FIG. 3 is as follows. An optical signal containing wavelength components of $\lambda 1$ and $\lambda 2$ multiplexed, for example, is input to the unit circuit 10. The input light signal passes through the first-stage $AMZ_1$, and two transmission spectra corresponding to the arm length difference are obtained.

One of the two transmission spectra is incident on $AMZ_{2A}$ from one of the two output ports of the $AMZ_1$, and the other transmission spectrum is incident on $AMZ_{2B}$ from the other output port of the $AMZ_1$. The light incident on the $AMZ_{2A}$ is split into two transmission components and "output 1" is obtained from one of the two output ports of the $AMZ_{2A}$. The target wavelength acquired as the "output 1" is, for example, $\lambda 1$. In general, it is difficult to precisely extract the $\lambda 1$ component due to manufacturing tolerance, variation in refractive index, and other factors. To solve this inconvenience, the monitor 14-2 is provided for monitoring the power level of the "output 1", and the monitoring result is supplied to the control circuit 15-1.

Similarly, the target wavelength acquired as the "output 2" is, for example, $\lambda 2$; however, it is generally difficult to precisely extract only the $\lambda 2$ component. To solve this inconvenience, the monitor 14-4 is provided for monitoring the power level of the "output 2", and the monitoring result is supplied to the control circuit 15-1.

Based upon the monitoring results from the monitor 14-2 and the monitor 14-4, the control circuit 15-1 controls the phase shifter 12-1 of the $AMZ_1$ in a direction to increase the power level of the two output lights of the unit circuit 10. One example of power increase control is regulating the phase shifter 12-1 so as to increase the total sum of the light power monitored by the monitor 14-2 and the monitor 14-4. As another example, the phase shifter 12-1 may be controlled so as to increase the value expressed as a cubic (or the third degree) function of the monitored light power.

A light component that has not transmitted through toward the "output 1" travels toward the other output port of the $AMZ_{2A}$. The light component observed at the other output port of $AMZ_{2A}$ does not contribute to the output power of the unit circuit 10. This unused light component is monitored by the monitor 14-1 and the monitoring result is supplied to the control circuit 16-1. The control circuit 16-1 controls the phase shifter 12-2 of the $AMZ_{2A}$ in a direction to decrease the unnecessary light component that does not contribute to the output of the unit circuit 10, whereby the optical loss is suppressed.

Similarly, a light component that has not transmitted toward the "output 2" travels toward the other output port of the $AMZ_{2B}$. The light component observed at the other output port of $AMZ_{2B}$ does not contribute to the output power of the unit circuit 10. This unused light component is monitored by the monitor 14-3 and the monitoring result is supplied to the control circuit 16-2. The control circuit 16-2 controls the phase shifter 12-3 of the $AMZ_{2B}$ in a direction to decrease the unnecessary light component that does not contribute to the output of the unit circuit 10, whereby the optical loss is suppressed.

The configuration of FIG. 3 can compensate for variations in manufacturing processes of the optical waveguides of each AMZ and variations in refractive index due to temperature fluctuations. Each AMZ of the unit circuit 10 is regulated to the optimum condition for the wavelengths of the input WDM signal. By increasing the output power levels of the light components containing the target wavelengths, while decreasing unused light components, optical loss and crosstalk are reduced and accurate wavelength separation is achieved.

First Embodiment

Figure 5:
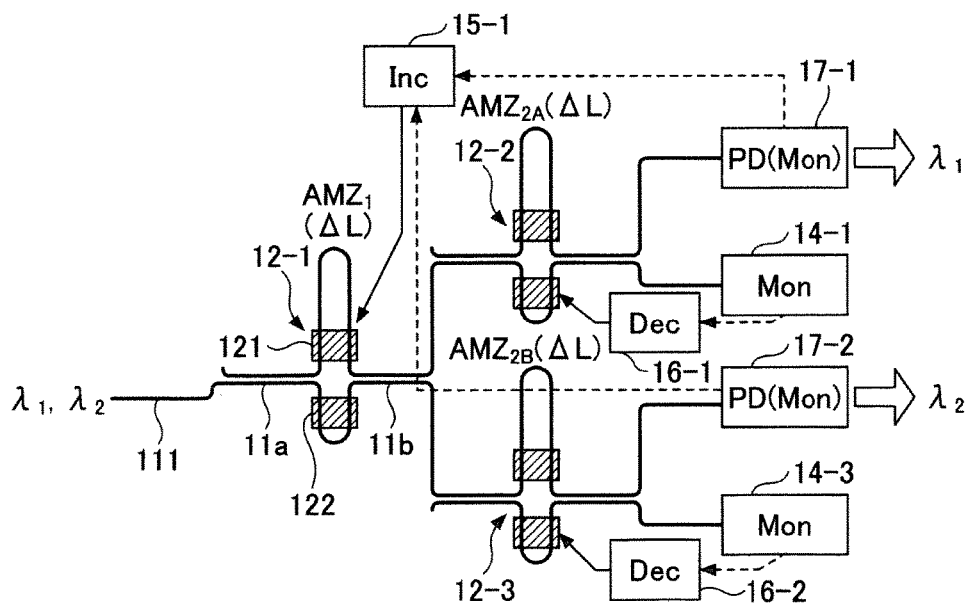
FIG. 5 is a schematic diagram of an optical multiplexer according to the first embodiment.

FIG. 5 is a schematic diagram of the optical demultiplexer 1A according to the first embodiment. The optical demultiplexer 1A has a minimum configuration using one unit circuit 10 illustrated in FIG. 3 to perform wavelength separation for a two-wavelength WDM signal. The optical demultiplexer 1A has three asymmetric Mach Zehnder interferometers $AMZ_1$, $AMZ_{2A}$ and $AMZ_{2B}$ cascaded in a tournament tree. The $AMZ_1$, $AMZ_{2A}$ and $AMZ_{2B}$ have the same arm length difference $\Delta L$.

When the optical demultiplexer 1A is fabricated monolithically in a silicon (Si) integrated circuit, the core of the input waveguide 111 and the cores of the optical waveguides of each AMZ are formed of Si, for example, and the clad is formed of $SiO_2$, for example. The optical waveguide is not limited to one with the Si core and the $SiO_2$ clad, and any suitable materials that can confine the light into the core may be employed. For example, an optical waveguide may be formed by quartz glass, transparent resin or the like over a quartz substrate.

In FIG. 5, directional couplers are used as 3-dB couplers 11a and 11b provided on the input side and the output side of the AMZ, respectively. The present invention is not limited to this example, and any other suitable multiplexing/demultiplexing configuration such as multi-mode interference (MMI) optical waveguide may be employed.

The phase shifter 12 provided in each AMZ may have a part 121 provided to the upper arm and a part 122 provided to the lower arm. The phase shifter 12 may be formed by a thin film of a metal such as tungsten (W), titanium (Ti), platinum (Pt), nickel (Ni), or the like, serving as an electric resistor. Upon application of electric current onto the electric resistor, heat is generated and the temperature of the associated optical waveguides change. The temperature change in the optical waveguides causes the index of refraction to change, thereby regulating the optical phase of the light passing through the optical waveguide.

Figure 6A:
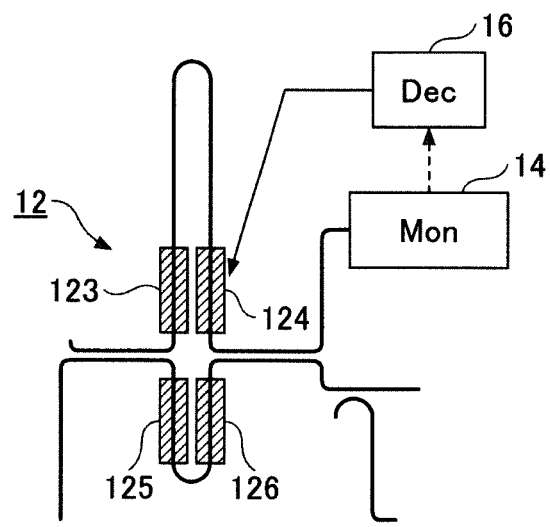
FIG. 6A illustrates an example of a phase shifter.
Figure 6B:
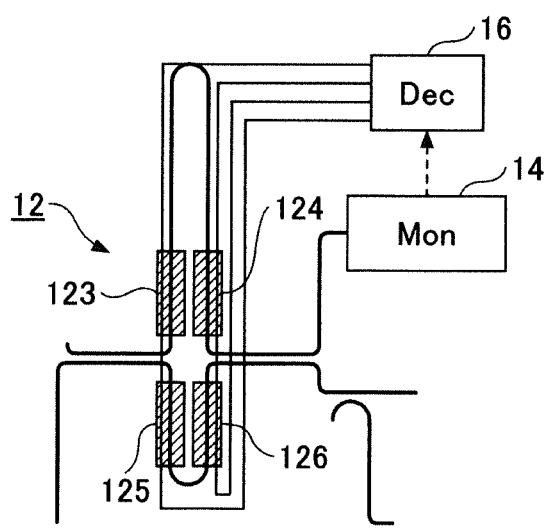
FIG. 6B illustrates an example of a phase shifter.

FIG. 6A and FIG. 6B illustrate an example of the phase shifter 12. Thin films 123 and 124 of electric resistors are provided along the upper-arm optical waveguide of the AMZ and thin films 125 and 126 of electric resistors are provided along the lower-arm optical waveguide of the AMZ. Thin films 123 and 124 of the electric resistor are arranged in series and connected to the terminals of the control circuit 16, and the thin films 125 and 126 of the electric resistor are arranged in series and connected to other terminals of the control circuit 16, as illustrated in FIG. 6B.

The phase shifter 12 is controlled by a control signal output from the control circuit 16, as illustrated in FIG. 6A. The configuration of the phase shifter 12 is not limited to the example illustrated in FIG. 6A and FIG. 6B. For example, the refractive index may be changed by electrically increasing or decreasing the carrier density in the waveguide making use of the carrier plasma effect, or alternatively, an electro-optic effect may be used.

Returning to FIG. 5, the incident WDMA signal passes through $AMZ_1$ and is split into two transmission components whose spectra are inverted relative to each other. One of the transmission spectra is incident on the $AMZ_{2A}$, and the other is incident on the $AMZ_{2B}$.

A first output light of $\lambda 1$ is output from one of the two output ports of the $AMZ_{2A}$ to which a photodiode (PD) 17-1 is connected. A second output light of $\lambda 2$ is output from one of the two output ports of the $AMZ_{2B}$ to which a photodiode (PD) 17-2 is connected.

The PD 17-1 and the PD 17-2 serve as power monitors of the output lights, and the monitoring results are supplied to the control circuit 15-1. The control circuit 15-1 controls the phase shifter 12-1 in a direction to increase the optical power monitored at the PDs 17-1 and 17-2.

The control direction can be judged by, for example, changing the amount of electric current injected to the phase shifter 12-1 in one direction with a given step size at the beginning of the control and monitoring the direction of change in the output levels of the PDs 17-1 and 17-2.

At the other output port of the $AMZ_{2A}$, the light component that has not been transmitted toward the PD 17-1 is monitored by the monitor 14-1. The monitoring result is supplied to the control circuit 16-1. The control circuit 16-1 controls the phase shifter 12-2 such that the monitoring result of the monitor 14-1 decreases.

At the other output port of the $AMZ_{2B}$, the light component that has not been transmitted toward the PD 17-2 is monitored by the monitor 14-3. The monitoring result is supplied to the control circuit 16-2. The control circuit 16-2 controls the phase shifter 12-3 such that the monitoring result of the monitor 14-3 decreases.

The control circuit 15-1 and the control circuits 16-1 and 16-2 carry out control on the phase shifters 12-1 to 12-3 according to the above-described rules, whereby the transmission characteristics of the $AMZ_1$, $AMZ_{2A}$, and $AMZ_{2B}$ can be configured optimally with respect to the input WDM signal.

Second Embodiment

Figure 7:
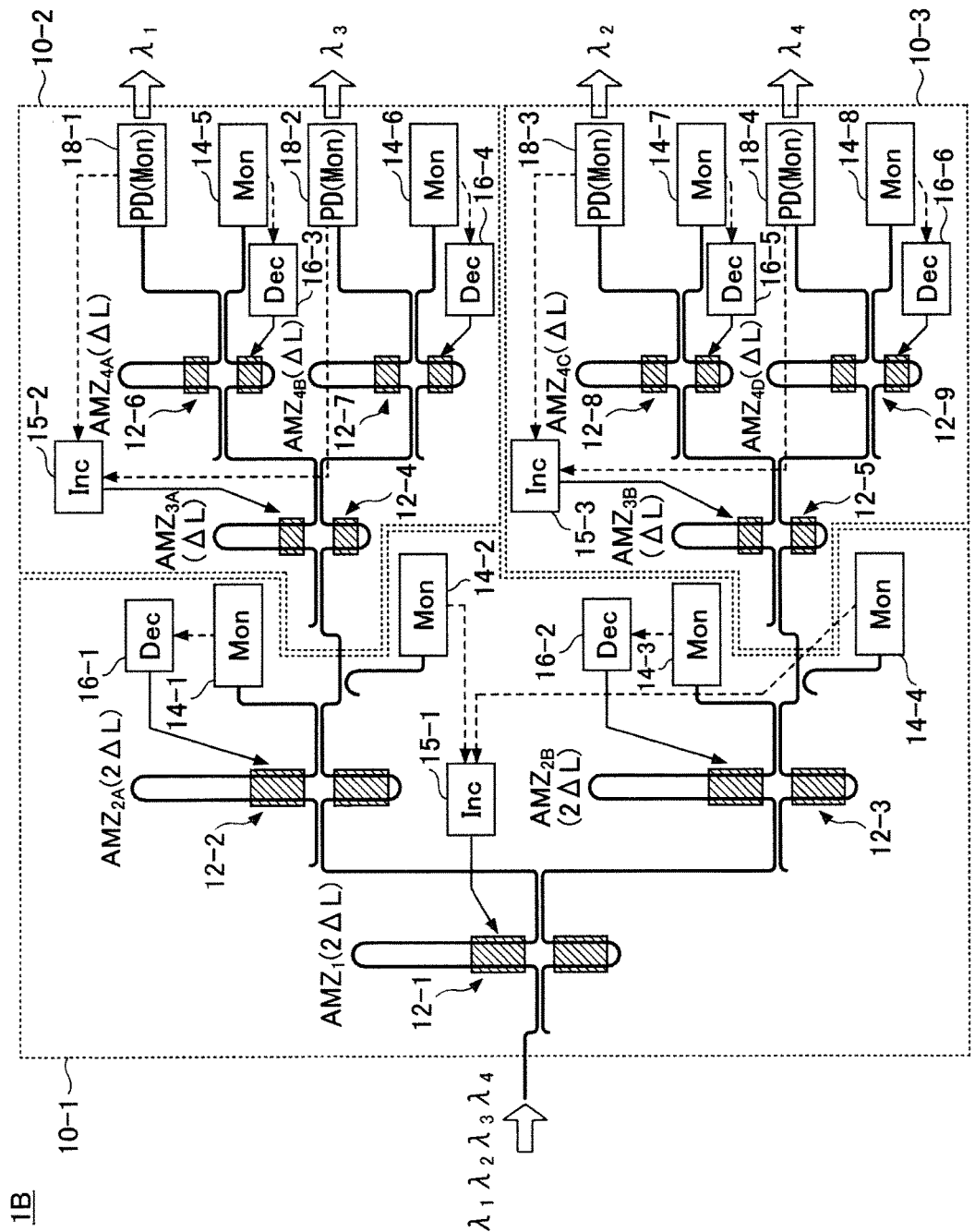
FIG. 7 is a schematic diagram of an optical multiplexer according to the second embodiment.

FIG. 7 is a schematic diagram of the optical demultiplexer 1B of the second embodiment. The optical demultiplexer 1B is formed by three unit circuits 10 of FIG. 3, which are cascaded in a multistage tournament tree. The two outputs of the first unit circuit 10-1 of the optical demultiplexer 1B are connected to the input of the second unit circuit 10-2 and the input of the third unit circuit 10-3, respectively.

The arm length difference of each AMZ of the first unit circuit 10-1 is set to $2\Delta L$. The arm length difference of each AMZ of the second unit circuit 10-2 and the third unit circuit 10-3 is set to $\Delta L$. Assuming that the arm length difference of the AMZs in the m-th stage unit circuit 10 is $\Delta L_m$, then $\Delta L_m$ is half the $\Delta L_{m-1}$ ($\Delta L_m = \Delta L_{m-1}/2$).

The optical demultiplexer 1B has a total of four output ports, two from the second unit circuit 10-2 and two from the third unit circuit 10-3, and it is configured to separate the wavelengths $\lambda 1$ to $\lambda 4$ from the WDM signal with four wavelength components multiplexed therein.

The interval of the wavelengths to be separated is determined by the arm length difference ΔL of the associated AMZ. The periods of the transmission spectra of the second unit circuit 10-2 and the third unit circuit 10-3 are twice the period of the transmission spectrum of the first unit circuit 10-1.

The circuit configuration of the first unit circuit 10-1 is the same as that of the unit circuit 10 explained above with reference to FIG. 3. The circuit configurations of the second unit circuit 10-2 and the third unit circuit 10-3 are the same as that of the optical demultiplexer 1A illustrated in FIG. 5.

The second unit circuit 10-2 has three asymmetric Mach-Zehnder interferometers $AMZ_{3A}$, $AMZ_{4A}$, and $AMZ_{4B}$ cascaded in a tournament tree. Phase shifters 12-4, 12-6 and 12-7 are provided to $AMZ_{3A}$, $AMZ_{4A}$, and $AMZ_{4B}$, respectively.

A PD 18-1 is connected to one of the two output ports of the $AMZ_{4A}$ to detect the light component of λ1, and it outputs the detection result of λ1 as the first output of the optical demultiplexer 1B. The power monitoring result of this light component is also supplied to the control circuit 15-2 (labelled as "Inc" in the figure). The other output port of the $AMZ_{4A}$ is provided with a monitor 14-5, and the monitoring result is supplied to the control circuit 16-3 (labelled as "Dec" in the figure).

A PD 18-2 is connected to one of the two output ports of the $AMZ_{4B}$ to detect the light component of λ3, and it outputs the detection result of λ3 as the second output of the optical demultiplexer 1B. The power monitoring result of this light component is also supplied to the control circuit 15-2 (labelled as "Inc" in the figure). The other output port of the $AMZ_{4B}$ is provided with a monitor 14-6, and the monitoring result is supplied to the control circuit 16-4 (labelled as "Dec" in the figure).

The control circuit 15-2 controls the phase shifter 12-4 in a direction to increase the sum of the output powers of the PD 18-1 and PD 18-2.

The control circuit 16-3 controls the phase shifter 12-6 so as to decrease the monitored level of the monitor 14-5. The control circuit 16-4 controls the phase shifter 12-7 so as to decrease the monitored level of the monitor 14-6.

The third unit circuit 10-3 has three asymmetric Mach-Zehnder interferometers $AMZ_{3B}$, $AMZ_{4C}$, and $AMZ_{4D}$ cascaded in a tournament tree. Phase shifters 12-5, 12-8 and 12-9 are provided to $AMZ_{3B}$, $AMZ_{4C}$, and $AMZ_{4D}$, respectively.

A PD 18-3 is connected to one of the two output ports of the $AMZ_{4C}$ to detect the light component of λ2, and it outputs the detection result of λ2 as the third output of the optical demultiplexer 1B. The power monitoring result of this light component is also supplied to the control circuit 15-3 (labelled as "Inc" in the figure). The other output port of the $AMZ_{4C}$ is provided with a monitor 14-7, and the monitoring result is supplied to the control circuit 16-5 (labelled as "Dec" in the figure).

A PD 18-4 is connected to one of the two output ports of the $AMZ_{4D}$ to detect the light component of λ4, and it outputs the detection result of λ4 as the fourth output of the optical demultiplexer 1B. The power monitoring result of this light component is also supplied to the control circuit 15-3 (labelled as "Inc" in the figure). The other output port of the $AMZ_{4D}$ is provided with a monitor 14-8, and the monitoring result is supplied to the control circuit 16-6 (labelled as "Dec" in the figure).

The control circuit 15-3 controls the phase shifter 12-5 in a direction to increase the sum of the output powers of the PD 18-3 and PD 18-4.

The control circuit 16-5 controls the phase shifter 12-8 so as to decrease the monitored level of the monitor 14-7. The control circuit 16-6 controls the phase shifter 12-9 so as to decrease the monitored level of the monitor 14-8.

In operations of the optical demultiplexer 1B, upon input of a WDM signal with wavelength components of λ1 to λ4 multiplexed therein, the WDM signal is separated at the first unit circuit 10-1 into a first transmission spectrum and a second transmission spectrum.

The first transmission spectrum is determined by the product of the transmission spectra of the $AMZ_1$ and the $AMZ_{2A}$ having the same arm length difference 2ΔL. The first transmission spectrum is input to the second unit circuit 10-2. The second transmission spectrum is determined by the product of the transmission spectra of the $AMZ_1$ and the $AMZ_{2B}$ having the same arm length difference 2ΔL. The second transmission spectrum is input to the third unit circuit 10-3.

Ideally, the first transmission spectrum contains peak waveforms of λ1 and λ3, and the second transmission spectrum contains peak waveforms of λ2 and λ4. Before the control, however, the transmission spectra do not necessarily contain only the target wavelength components, but also contain other components due to the influence of variations in manufacturing processes, etc.

When the control starts, the phase shifter 12-1 is controlled by the control circuit 15-1 in a direction to increase the power of the target light spectrum, and phase shifters 12-2 and 12-3 are controlled by the control circuits 16-1 and 16-2, respectively, in a direction to decrease the unused spectrum components. Consequently, optical loss, crosstalk and the like are suppressed in the two transmission spectra output from the first unit circuit 10-1.

In the second unit circuit 10-2, the first transmission spectrum is further separated into two transmission spectra by the $AMZ_{3A}$. The three AMZs of the second unit circuit 10-2 have an arm length difference half the arm length difference of the AMZs of the first unit circuit 10-1. The transmission spectra separated by the $AMZ_{3A}$ has a period twice that of the input transmission spectrum.

One of the two separated transmission spectra is incident on and travels through the $AMZ_{4A}$, and is detected by the PD 18-1 connected to one output port of the $AMZ_{4A}$. The other transmission spectrum is incident on and travels through the $AMZ_{4B}$, and is detected by the PD 18-2 connected to one output port of the $AMZ_{4B}$.

The control circuit 15-2 controls the $AMZ_{3A}$ so as to increase the output power of the PD 18-1 and PD 18-2. The control circuits 16-3 and 16-4 operate so as to decrease the light components that do not contribute to the output power. With this configuration, the signal component of λ1 is detected by the PD 18-1 and output from the associated output port, and the signal component of λ3 is detected by the PD 18-2 and output from the associated output port.

The same operation is performed in the third unit circuit 10-3, in which the signal component of λ2 is output and detected by the PD 18-3, and the signal component of λ4 is output and detected by the PD 18-4.

Figure 8A:
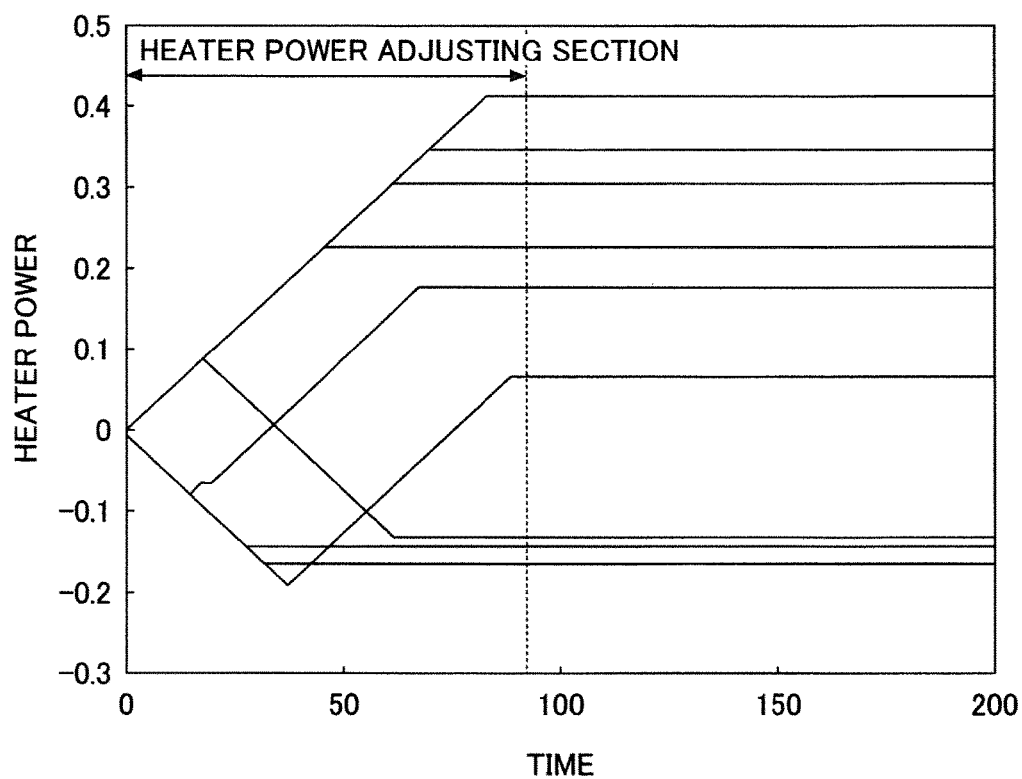
FIG. 8A is a diagram illustrating simulation results of the configuration of the second embodiment.
Figure 8B:
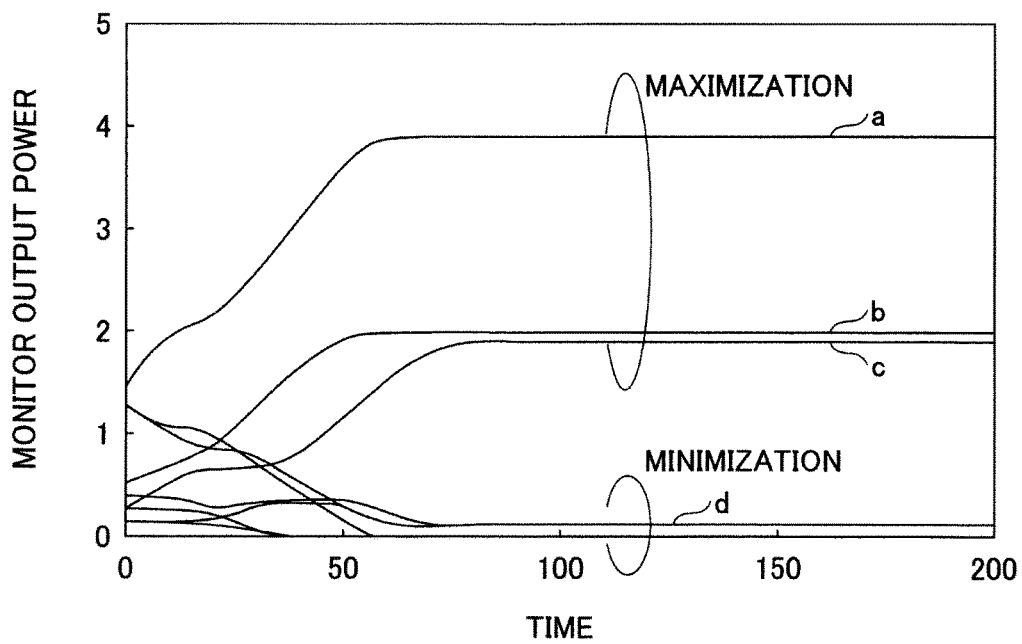
FIG. 8B is a diagram illustrating simulation results of the configuration of the second embodiment.

FIG. 8A and FIG. 8B are diagrams illustrating simulation results of the control scheme of the second embodiment. FIG. 8A is a plot of control patterns of the nine phase shifters 12-1 to 12-9 of the optical demultiplexer 1B. The horizontal axis represents time, and the vertical axis represents the power level of the heater provided to the associated phase shifter 12. FIG. 8B is a plot of the monitored power levels of the optical demultiplexer 1B as a function of time. The horizontal axis that represents time in FIG. 8B has the same scale as that of FIG. 8A. The vertical axis of FIG. 8B represents monitored power level.

In FIG. 8B, line "a" represents the monitor power (which is the sum of the outputs of the monitor 14-2 and the monitor 14-4) supplied to the control circuit 15-1 for controlling the $AMZ_1$. Line "b" and line "c" represent the monitored power levels input to the control circuit 15-2 for the $MAZ_{3A}$ of the second unit circuit 10-2 and the control circuit 15-3 for the $MAZ_{3B}$ of the third unit circuit 10-3, respectively.

By performing power increase control at the control circuit 15-1 of the first unit circuit 10-1, the power levels of the transmission spectra to be supplied to the second unit circuits 10-2 and the third unit circuit 10-3 of the subsequent stage are maximized. By performing power increase control at the control circuits 15-2 of the second unit circuit 10-2 and the control circuit 15-3 of the third unit circuit, respectively, the power levels of the light components of the wavelengths λ1 to λ4 output and detected by the PDs 18-1 to PD-4 can be maximized.

The line group "d" represents the monitored power levels input to the control circuits 16-1 to 16-6 for power decrease control. By controlling at the control circuit 16-1 to 16-6 in a direction to decrease the output levels of the associated monitors, the light components that do not contribute to the output of the optical demultiplexer 1B can be minimized.

When the monitored powers become stable after a certain period of time, the control on the respective heaters are also stabilized.

Figure 9A:
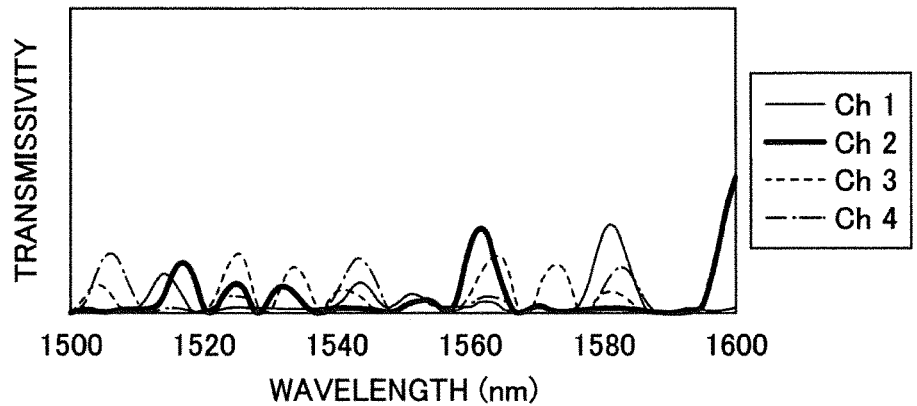
FIG. 9A is a diagram illustrating an advantageous effect of the second embodiment.
Figure 9B:
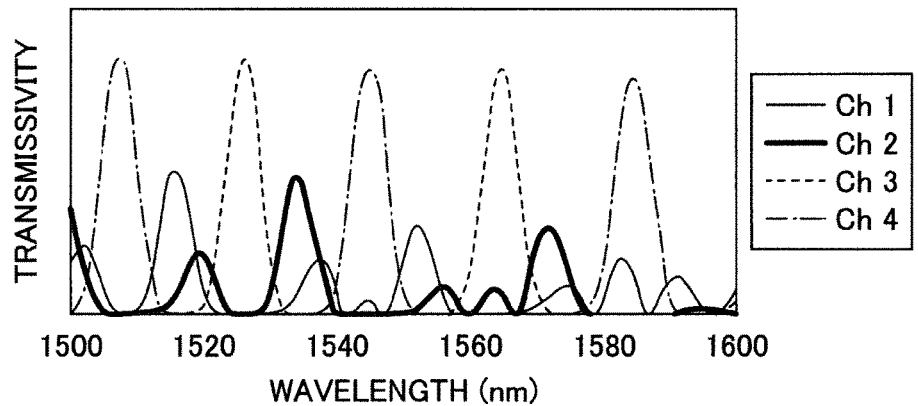
FIG. 9B is a diagram illustrating an advantageous effect of the second embodiment.
Figure 9C:
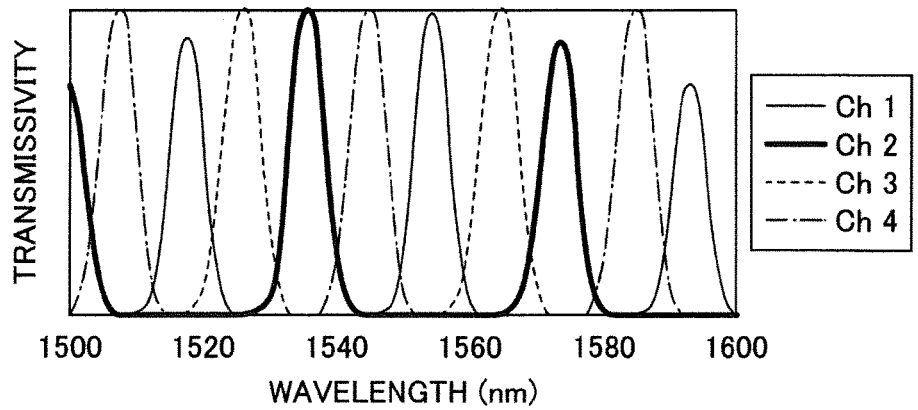
FIG. 9C is a diagram illustrating an advantageous effect of the second embodiment.

FIG. 9A to FIG. 9C illustrate the transmission spectra of the optical demultiplexer 1B. FIG. 9A demonstrates the transmission spectra before correction, FIG. 9B demonstrates the transmission spectra halfway through the correction control, and FIG. 9C demonstrates the transmission spectra after the correction. In these figures, the horizontal axis represents wavelength and the vertical axis represents transmissivity. The correction is autonomously performed by carrying out the above-described control operations using the control circuits 15-1 to 15-3 for power increase and the control circuits 16-1 to 16-6 for power decrease, based upon the monitoring results.

In FIG. 9A, before the correction, the power levels of the target wavelengths are insufficient at the respective channels, and the signal components are mixed from the other channels into the target channel. In FIG. 9B, in the middle of control, the output level of the target channel is increasing, and undesirable wavelength components are decreasing. In FIG. 9C, after the control, the spectra of the respective wavelengths are clearly separated.

The optical demultiplexer 1B compensates for variations in at least one of the refractive index and the path length difference of the AMZs due to temperature change, production tolerance, etc., and it can demultiplex a WDM signal into signal components of the respective wavelengths accurately.

Although in FIG. 7 three unit circuits 10 are cascaded in a two-stage tournament tree to acquire four wavelengths of output signals, the number of unit circuits 10 connected and the number of stages cascaded may be further increased. By connecting other unit circuits to the two output ports of the unit circuit 10-2 and to the two output ports of the unit circuit 10-3, a 3-stage tournament tree with eight outputs for different wavelengths can be fabricated. By connecting the unit circuits 10 in N stages, the WMD signal containing $2^N$ wavelengths can be demultiplexed correctly.

As the number of unit circuits 10 to be connected is increased, it is unnecessary for the optical demultiplexer to be assembled only with unit circuits 10. For example, when demultiplexing a WDM signal with eight wavelengths (λ1 to λ8) multiplexed therein, the WDM signal may be first divided into two bands and then the optical demultiplexer 1B of FIG. 7 may be used for each of the divided bands.

Figure 10:
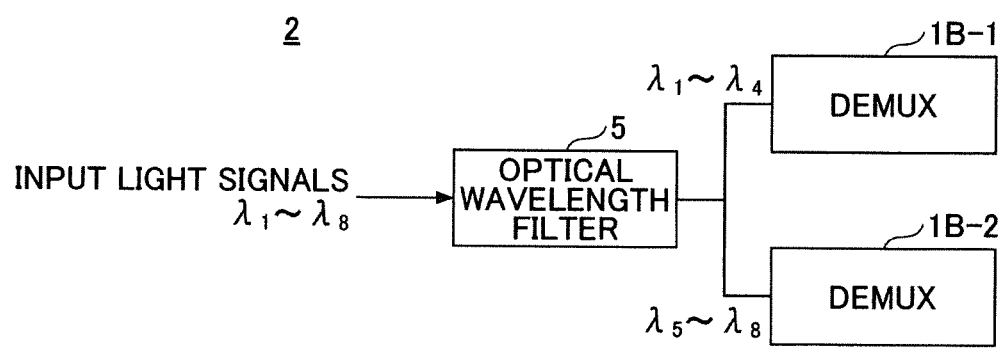
FIG. 10 illustrates a modification of the optical demultiplexer of the embodiment.

FIG. 10 illustrates a configuration of the optical demultiplexer circuit 2 which is a modification of the embodiments. The optical demultiplexer circuit 2 has a wavelength filter 5 and optical demultiplexers 1B-1 and 1B-2 connected in parallel to the output of the wavelength filter 5. The wavelength filter 5 is, for example, a fixed-wavelength optical filter configured to separate the input WDM signal into two bands, a short-wavelength band and a long-wavelength band, for example. For rough demultiplexing such as dividing the input signal band into two sub-bands, accuracy may not always be required for temperature control or process control. Accordingly, the circuit may be assembled using a fixed wavelength optical filter.

The short-wavelength band includes λ1 to λ4, and the long-wavelength band includes λ5 to λ8. The first band is input to the four-output optical demultiplexer 1B-1, and the second band is input to the four-output optical demultiplexer 1B-2. Each optical demultiplexer 1B behaves as described above with reference to FIG. 7, and optical loss and inter-channel crosstalk can be suppressed.

The rough demultiplexing is not limited to separation between the short-wavelength band and the long-wavelength band. In coarse WDM (CWDM), the wavelength intervals are relatively wide and wavelength bands are divided at equal intervals (20 nm intervals). In this case, every other wavelength may be taken out as the first group by a first-stage filter, and the rest of the wavelengths may be treated as the second group. The first group wavelengths and the second group wavelengths may be input to the optical demultiplexers 1B-1 and 1B-2, respectively, at the subsequent stage.

Third Embodiment

Figure 11:
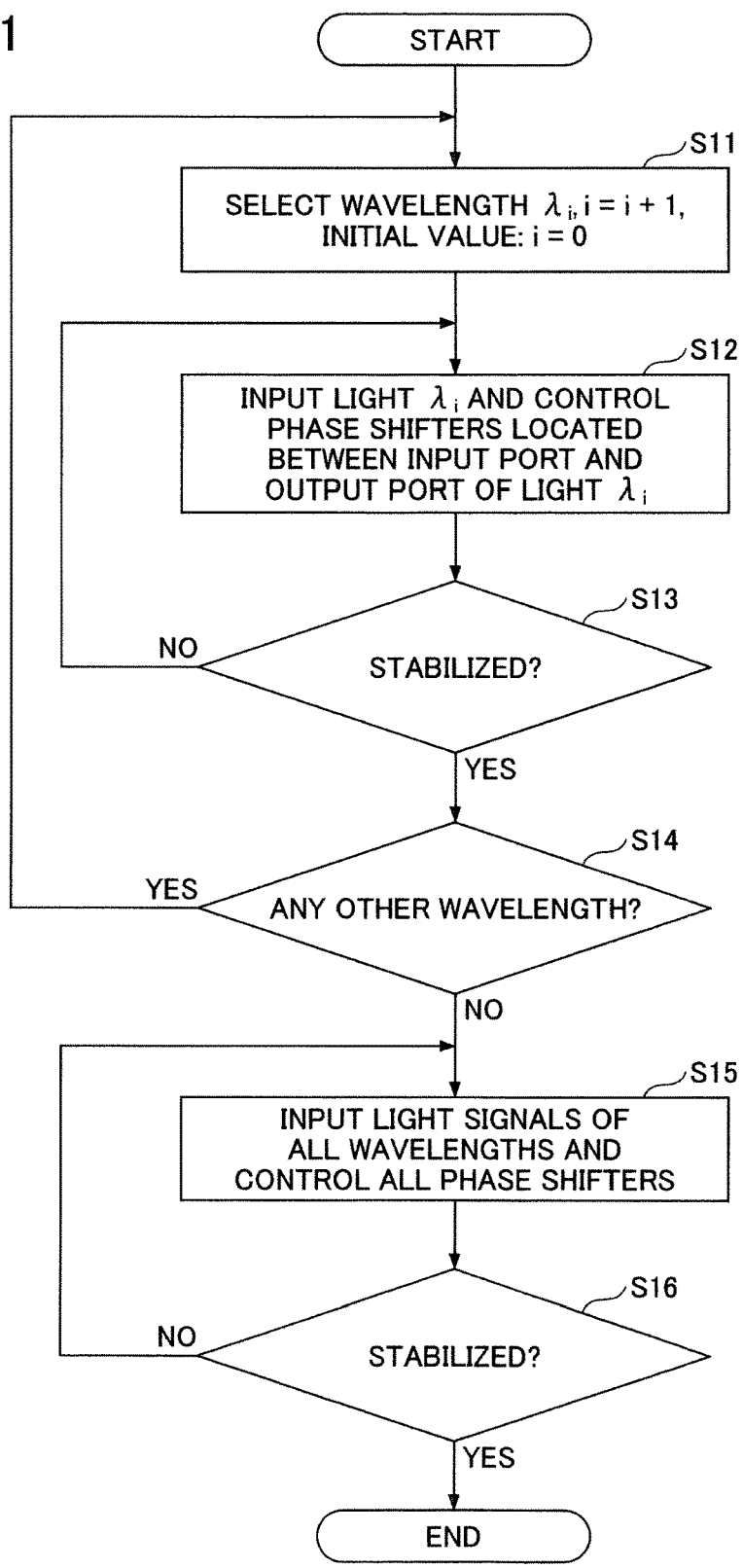
FIG. 11 is a flowchart of an optical demultiplexing control method according to the third embodiment.

FIG. 11 is a flowchart illustrating an optical demultiplexing control scheme according to the third embodiment. The techniques of the first and the second embodiments allow the wavelengths contained in the input signal to be monitored at once and demultiplexed into the respective wavelengths, while suppressing optical loss and inter-channel crosstalk. However, consideration on the correlation or the corresponding relation between the wavelengths and the channels has not been made sufficiently. The third embodiment provides an optical demultiplexing scheme which takes the corresponding relation between the wavelengths and the channels into account.

The optical demultiplexing control method of the third embodiment proposes to perform control operations across the entirety of the wavelengths, after performing power increase/decrease control for each of the wavelengths by regulating the phase shifters. This scheme can guarantee the corresponding relation between the wavelengths and the channels, and optical loss and crosstalk are further suppressed.

In step S11, the i-th wavelength $\lambda_i$ is selected, where i=i+1. The initial value of "i" is set to 0 to select the first wavelength.

In step S12, the selected wavelength $\lambda_i$ is input to the optical demultiplexer to control the phase shifters 12 positioned between the input port and the output port for this wavelength $\lambda_i$. The phase shifters 12 are controlled in the same manner as described in the first and second embodiments, namely, controlling the first-stage phase shifter in a direction to increase the power level of the light component monitored at the output port of the unit circuit 10, while controlling the second-stage phase shifters in a direction to decrease the power level of unnecessary light components that do not contribute to the output light of the unit circuit 10. Control on the other phase shifters that are not involved in the process for the target wavelength $\lambda_i$ is suspended temporarily. The output signals from the channels other than the target channel are substantially fixed to a fixed level.

In step S13, the control on the associated phase shifters is continued for the selected wavelength $\lambda_i$ until the output level of light component of this wavelength $\lambda_i$ is stabilized. When the output level is stabilized on the target channel of the wavelength $\lambda_i$ (YES in S13), the process proceeds to step S14 to judge whether there are any another wavelengths left. If there is another wavelength (YES in S14), the process returns to step S11, and the wavelength number is incremented to repeat steps S12 to S14.

When the regulation on the associated phase shifters 12 for each of the wavelengths is finished (NO in S14), the process proceeds to S15 in which the signal components of all the wavelengths are input at once and all the phase shifters 12 are controlled again. This overall control is continued, while continuing to input all the wavelength components, until the output levels of all the channels have stabilized. When the output levels of all the channels have stabilized (YES in S16), the process terminates.

The process of S15 is the same as the control process described in the first embodiment or the second embodiment. In the third embodiment, the transmission characteristics of the AMZs are first controlled for the individual wavelengths on the respective channels, and then steps S15 and S16 are performed in order to ensure the accurate wavelength separation under the condition where the actual WDM signal is inputted.

When the output power levels for all the wavelengths have stabilized in S16, optical communication is started actually. Although, in FIG. 11, the control is performed in the ascending order from the lower wavelength number, the inputting order of the wavelengths is not limited to this example as long as the transmission characteristics of the AMZs on the associated optical path are controlled for the individual wavelengths.

12A to 12E are diagrams for explaining the operation of the optical demultiplexer 1C of the third embodiment. As in the second embodiment, the optical demultiplexer 1C employs a configuration of four-channel wavelength demultiplexing.

Figure 12A:
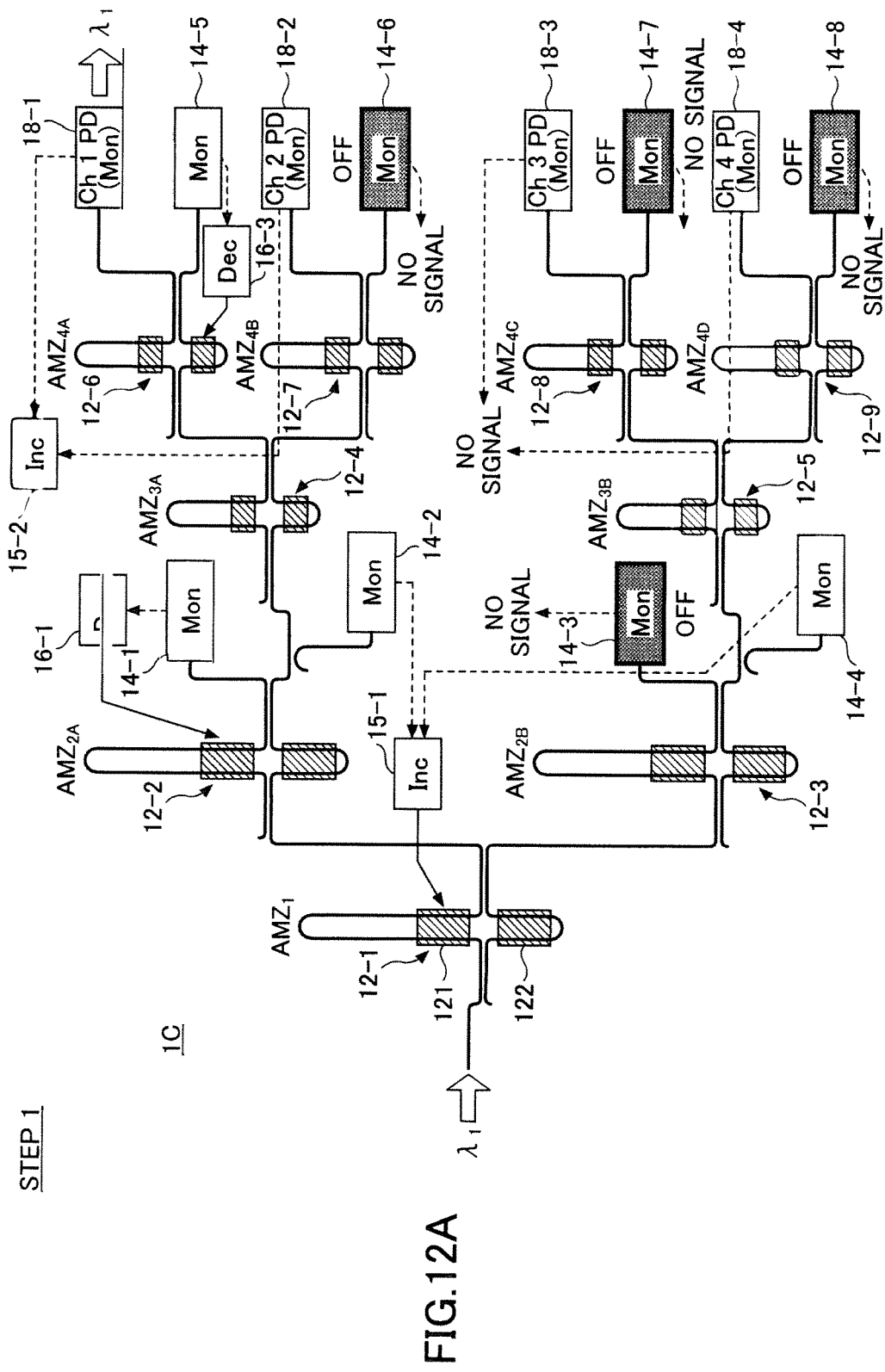
FIG. 12A is a diagram for explaining control for each wavelength of the wavelength demultiplexer according to the third embodiment.

In FIG. 12A, light of wavelength $\lambda 1$ is input to the optical demultiplexer 1C, and the phase shifters 12-1, 12-2, 12-4 and 12-6 provided to $AMZ_1$, $AMZ_{2A}$, $AMZ_{3A}$, and $AMZ_{4A}$ positioned on the optical path extending from the input port to the PD 18-1 (channel-1) are controlled.

The phase shifter 12-1 of the $AMZ_1$ is controlled by the control circuit 15-1 such that the sum of the output power levels of the monitor 14-2 and the monitor 14-4 increases.

The phase shifter 12-2 of the $AMZ_{2A}$ is controlled by the control circuit 16-1 such that the output power of the monitor 14-1 decreases.

The phase shifter 12-4 of the $AMZ_{3A}$ is controlled by the control circuit 15-2 such that the sum of the output power levels of the PD 18-1 and the PD 18-2 increases.

The phase shifter 12-6 of the $AMZ_{4A}$ is controlled by the control circuit 16-3 such that the output power of the monitor 14-5 decreases.

The monitor 14-3 and the monitors 14-6 to 14-8 which are not used for the control of $\lambda 1$ are turned off, and no monitor information is supplied to the associated phase shifters.

When the output power level of the PD 18-1 has stabilized under the control of the phase shifters 12-1, 12-2, 12-4, and 12-6, the control on $\lambda 1$ is terminated and light of the next wavelength is input.

Figure 12B:
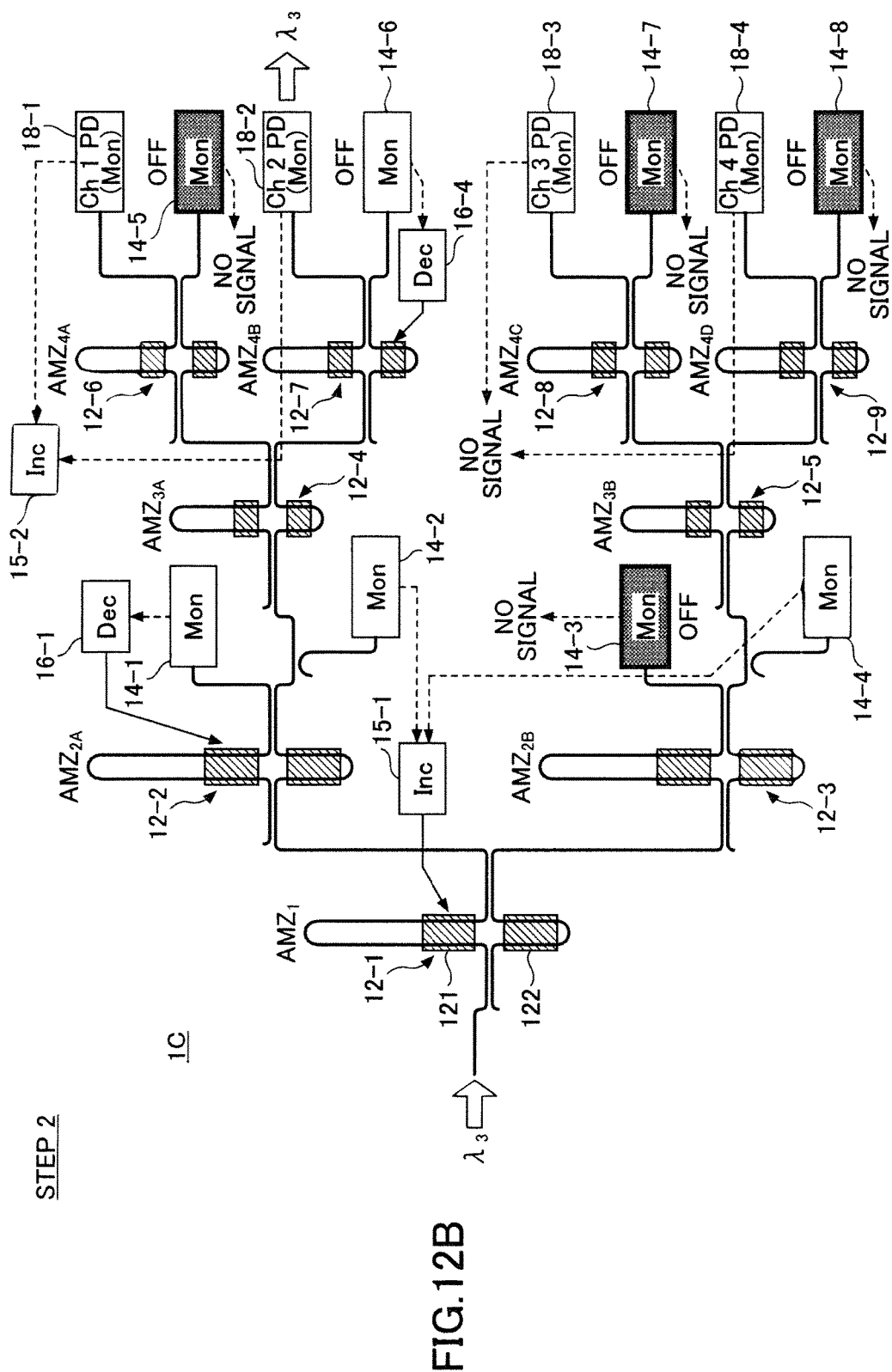
FIG. 12B is a diagram for explaining control for each wavelength of the wavelength demultiplexer according to the third embodiment.

In FIG. 12B, light of wavelength $\lambda 3$ is input to the optical demultiplexer 1C, and the phase shifters 12-1, 12-2, 12-4 and 12-7 of the $AMZ_1$, $AMZ_{2A}$, $AMZ_{3A}$, and $AMZ_{4B}$ positioned on the optical path extending from the input port to the PD 18-2 (channel-2) for receiving the light component of $\lambda 3$ are controlled.

The phase shifter 12-1 of the $AMZ_1$ is controlled by the control circuit 15-1 such that the sum of the output power levels of the monitor 14-2 and the monitor 14-4 increases.

The phase shifter 12-2 of the $AMZ_{2A}$ is controlled by the control circuit 16-1 such that the output power of the monitor 14-1 decreases.

The phase shifter 12-4 of the $AMZ_{3A}$ is controlled by the control circuit 15-2 such that the sum of the output power levels of the PD 18-1 and the PD 18-2 increases.

The phase shifter 12-7 of the $AMZ_{4B}$ is controlled by the control circuit 16-4 such that the output power of the monitor 14-6 decreases.

The monitors 14-3, 14-5, 14-7, and 14-8 which are not used for the control of $\lambda 3$ are turned off, and no monitor information is supplied to the associated phase shifters.

When the output power level of the PD 18-2 has stabilized under the control of the phase shifters 12-1, 12-2, 12-4, and 12-7, the control on $\lambda 3$ is terminated and light of the next wavelength is input.

Figure 12C:
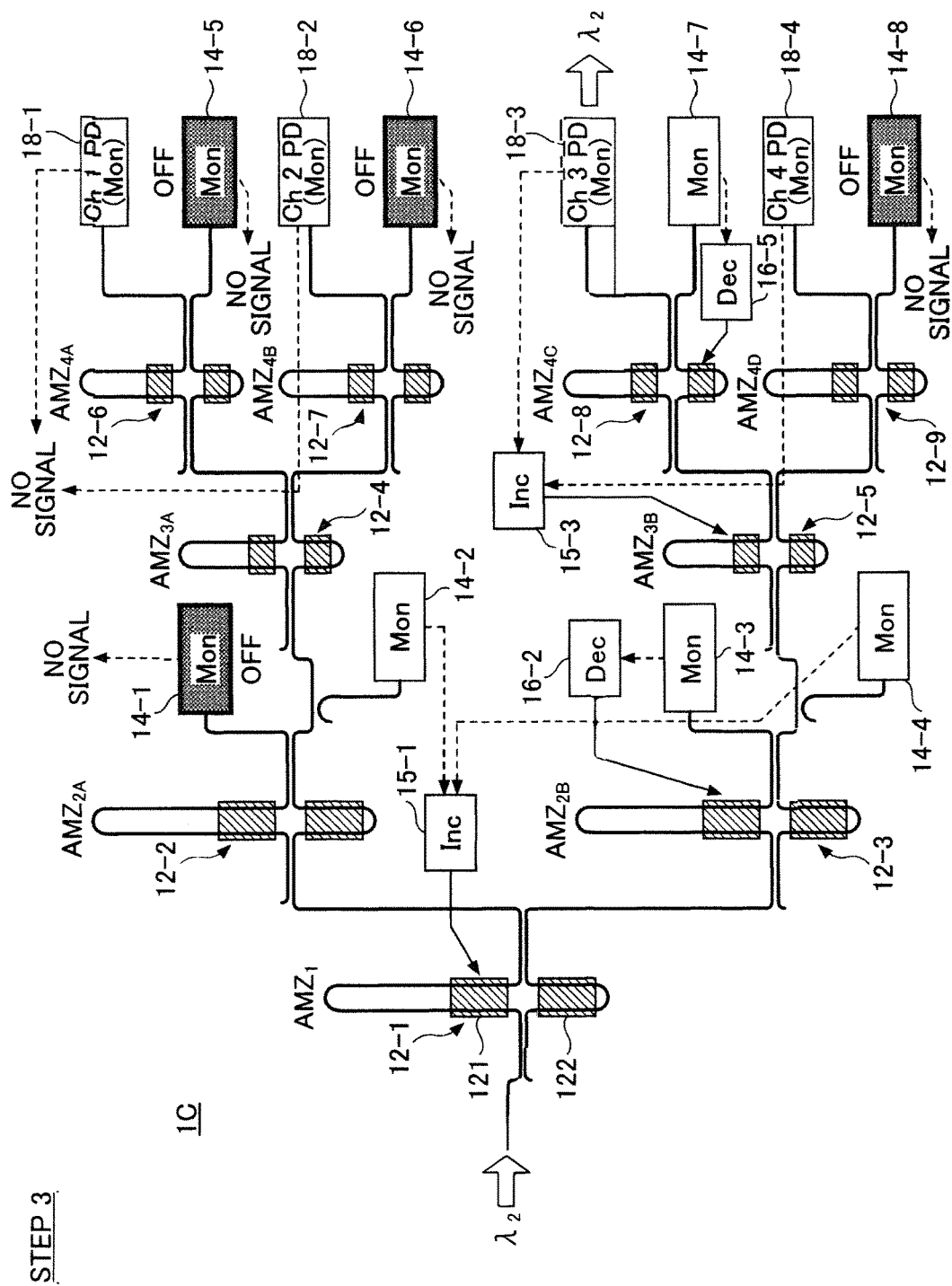
FIG. 12C is a diagram for explaining control for each wavelength of the wavelength demultiplexer according to the third embodiment.

Likewise, in FIG. 12C, light of $\lambda 2$ is input in order to control the channel-3. The phase shifter 12-1 of $AMZ_1$ is controlled by the control circuit 15-1 in a direction to increase the monitored power level. The phase shifter 12-3 of $AMZ_{2B}$ is controlled by the control circuit 16-2 in a direction to decrease the monitored power level. The phase shifter 12-5 of $AMZ_{3B}$ is controlled by the control circuit 15-3 in a direction to increase the monitored power level. The phase shifter 12-8 of $AMZ_{4C}$ is controlled by the control circuit 16-5 in a direction to decrease the monitored power level.

Figure 12D:
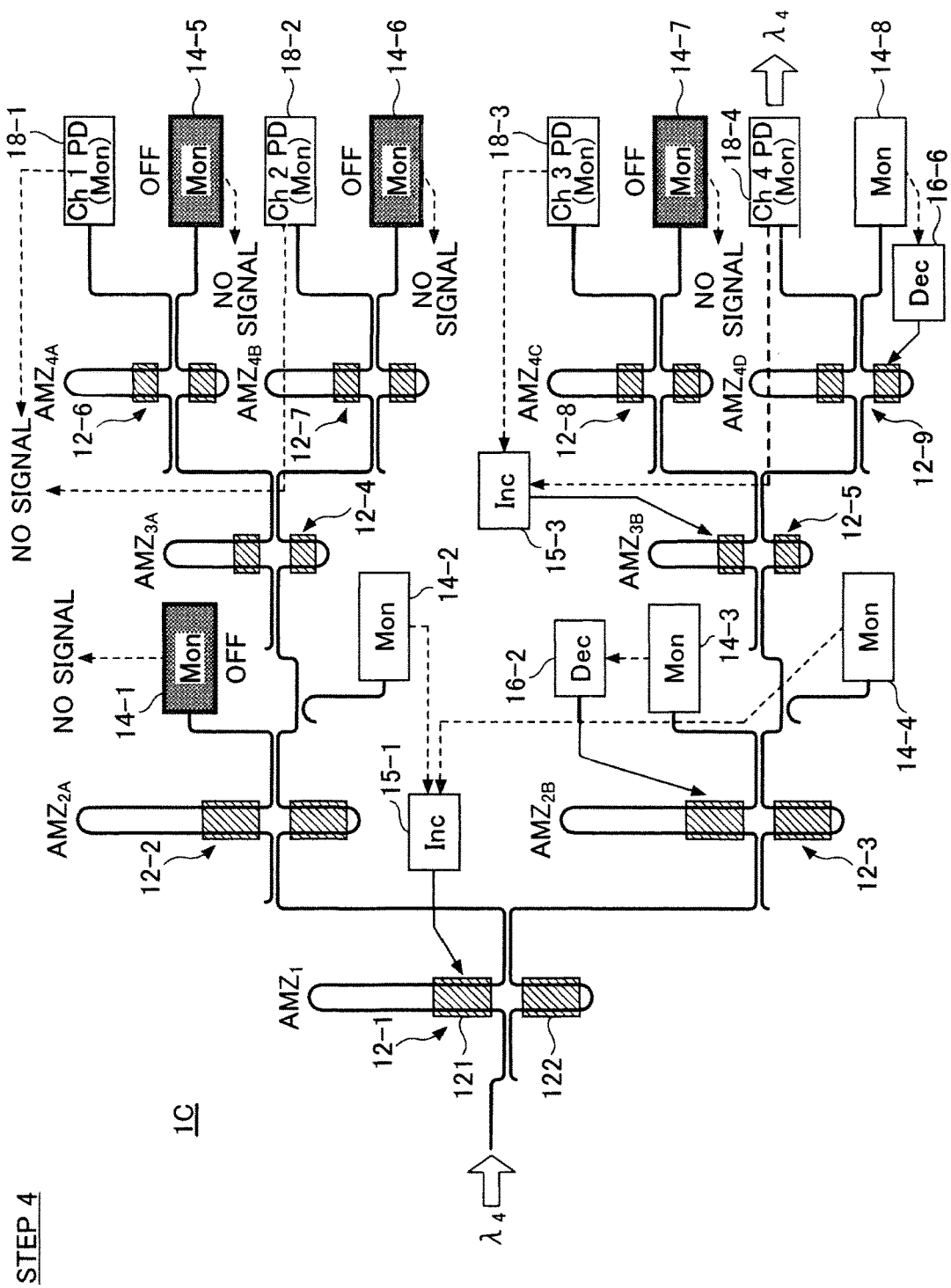
FIG. 12D is a diagram for explaining control for each wavelength of the wavelength demultiplexer according to the third embodiment.

In FIG. 12D, light of $\lambda 4$ is input in order to control the channel-4. The phase shifter 12-1 of $AMZ_1$ is controlled by the control circuit 15-1 in a direction to increase the monitored power level. The phase shifter 12-3 of $AMZ_{2B}$ is controlled by the control circuit 16-2 in a direction to decrease the monitored power level. The phase shifter 12-5 of $AMZ_{3B}$ is controlled by the control circuit 15-3 in a direction to increase the monitored power level. The phase shifter 12-9 of $AMZ_{4D}$ is controlled by the control circuit 16-6 in a direction to decrease the monitored power level.

By performing the operations illustrated in FIG. 12A to FIG. 12D, the wavelengths of the WDM signal are correlated to the appropriate output ports.

Figure 12E:
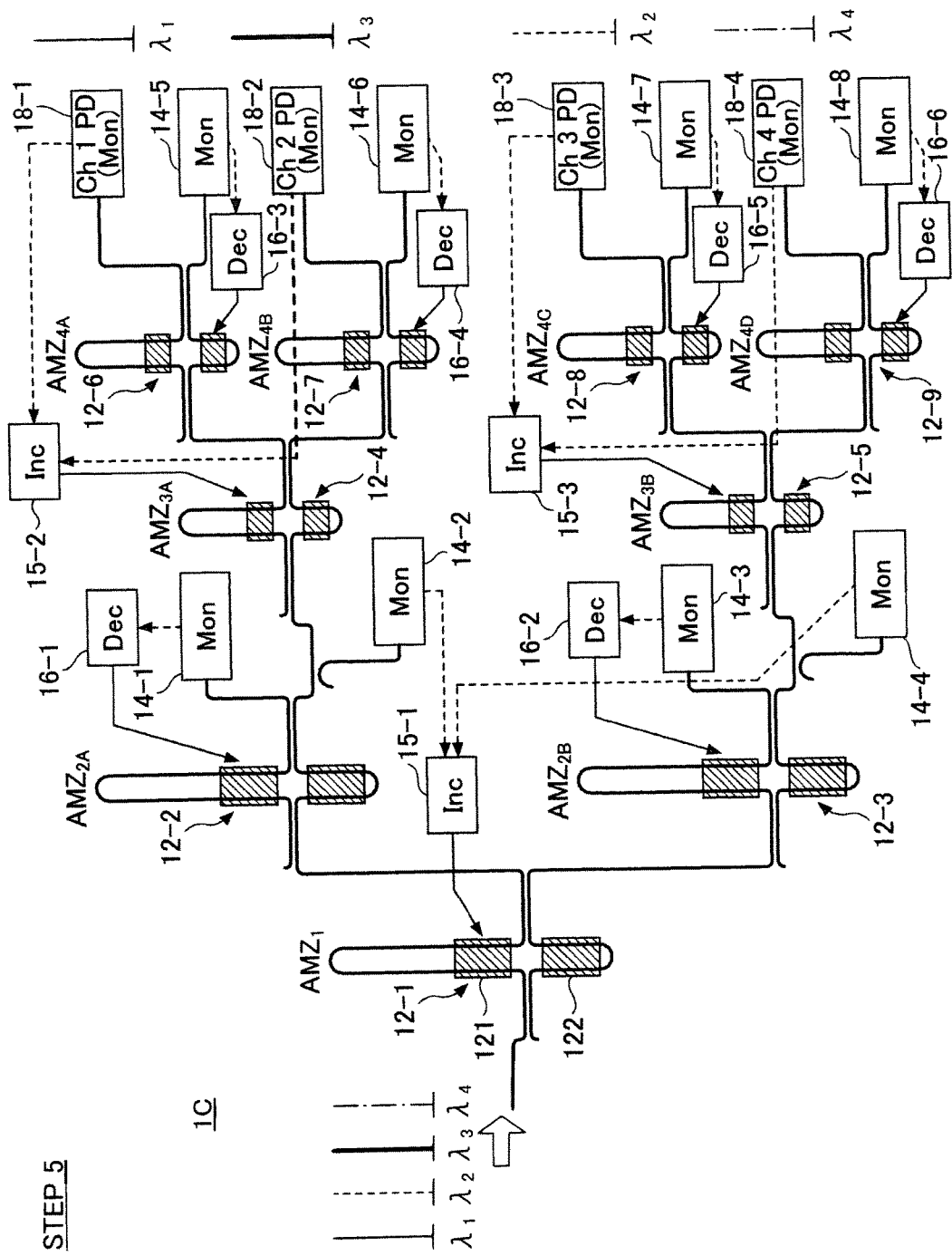
FIG. 12E is a diagram for explaining control for each wavelength of the wavelength demultiplexer according to the third embodiment.

In FIG. 12E, all the lights with wavelengths $\lambda 1$ to $\lambda 4$ are input all together to the optical demultiplexer 1C to control all the AMZs. After the stabilization, optical communication is started.

Figure 13:
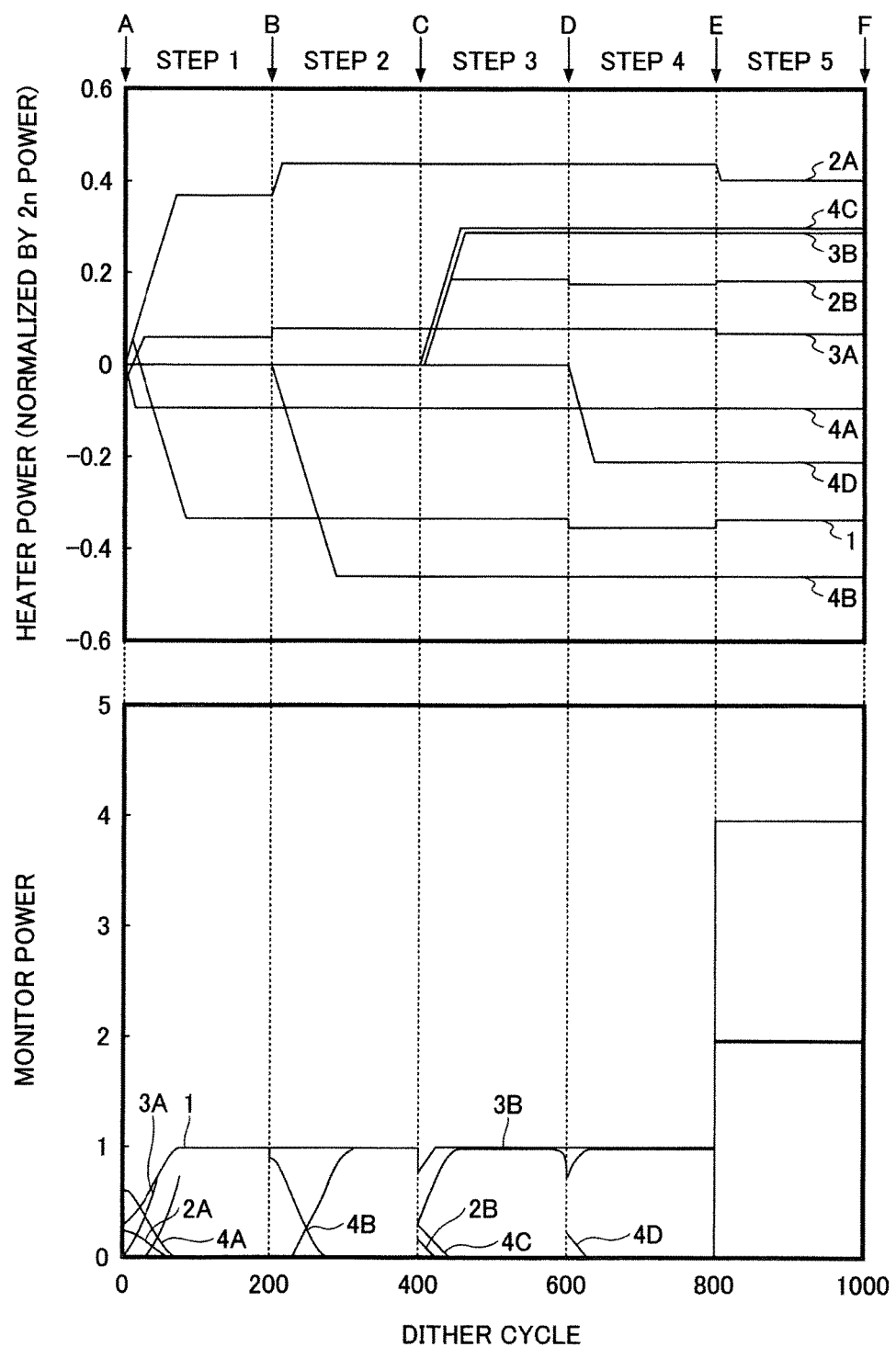
FIG. 13 is a diagram illustrating simulation results of the configuration of the third embodiment.

FIG. 13 illustrates the simulation results of the control operation of the third embodiment. The horizontal axis is time (dither cycle), the vertical axis of the lower part of the figure is monitor power, and the vertical axis of the upper part is heater power.

At time point A, the control on the wavelength $\lambda 1$ (step 1) is started. Based upon the monitored power levels used for control on the AMZ$_1$, AMZ$_{2A}$, AMZ$_{3A}$, and AMZ$_{4A}$, the phase shifters 12 provided to these AMZs are controlled. At time point B, the output of λ1 stabilizes and the heater powers of the corresponding phase shifters 12 become stable. At this point of time, the control on λ1 is terminated and the control on λ3 (step 2) is started.

In the time section of step 2, based upon the monitored power levels used for control on AMZ$_1$, AMZ$_{2A}$, AMZ$_{3A}$, and AMZ$_{4B}$, the phase shifters 12 provided to these AMZs are controlled. Mainly, the characteristics of AMZ$_{4B}$ are greatly adjusted, and the characteristics of the other involved AMZs are fine-tuned in accordance with the adjustment of the AMZ$_{4B}$. At time point C, the output of λ3 stabilizes. The control on λ3 is terminated and the control on λ2 (step 3) is started.

In the time section of step 3, based upon the monitored power levels used for control on AMZ$_1$, AMZ$_{2B}$, AMZ$_{3B}$, and AMZ$_{4C}$, the phase shifters 12 provided to these AMZs are controlled. Mainly, the characteristics of the AMZ$_{2B}$, AMZ$_{3B}$, and AMZ2$_{4C}$ are greatly adjusted, and the characteristics of other AMZs are fine-tuned as necessary. At time point D, the output of λ2 stabilizes. The control on λ2 is terminated and the control on λ4 (step 4) is started.

In the time section of step 4, based upon the monitored power levels used for control on AMZ$_1$, AMZ$_{2B}$, AMZ$_{3B}$, and AMZ$_{4D}$, the phase shifters 12 provided to these AMZs are controlled. Mainly, the characteristics of the AMZ$_{4D}$ are greatly adjusted, and the characteristics of the other AMZs are fine-tuned as necessary. At time point E, at which the output of λ4 has stabilized, the control on λ4 is terminated and all the wavelength components are input at once to start step 5.

In the time section of step 4, there is no great change in any AMZs because the characteristics of all the AMZs associated with the individual wavelengths have already been adjusted. At time point F, it is confirmed that all the wavelengths have stabilized, and the control for wavelength demultiplexing is terminated.

Figure 14A:
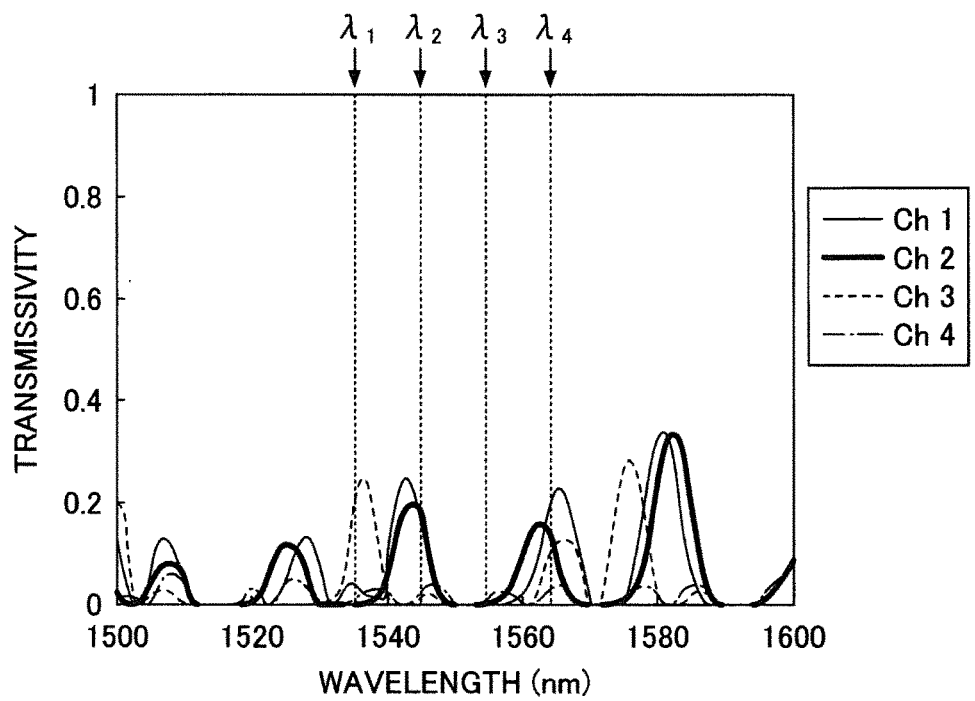
FIG. 14A is a diagram illustrating transmitted spectra at time point A in FIG. 13.

FIG. 14A is a diagram illustrating a transmission spectrum at time point A of FIG. 13. This point of time is immediately after the incidence of λ1. Many transmission spectra coexist between the channels, and the output levels are insufficient on all the channels.

Figure 14B:
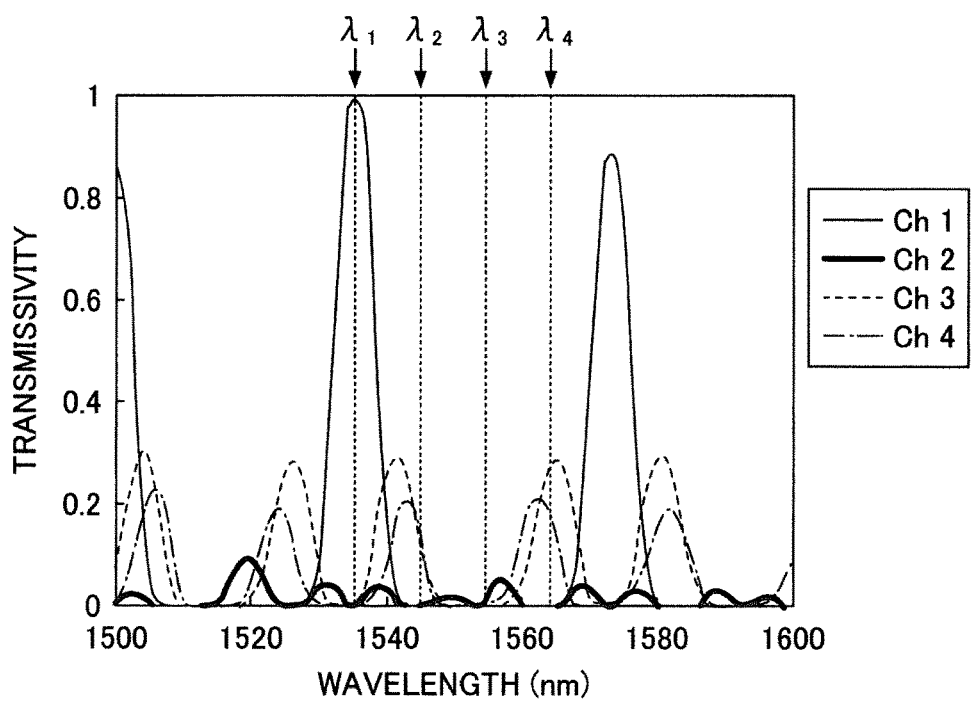
FIG. 14B is a diagram illustrating transmitted spectra at time point B in FIG. 13.

FIG. 14B is a diagram illustrating a transmission spectrum at time point B of FIG. 13. At time point B, the transmission spectrum of λ1 is projecting on channel 1, but the transmission spectra of the other channels are still insufficient.

Figure 14C:
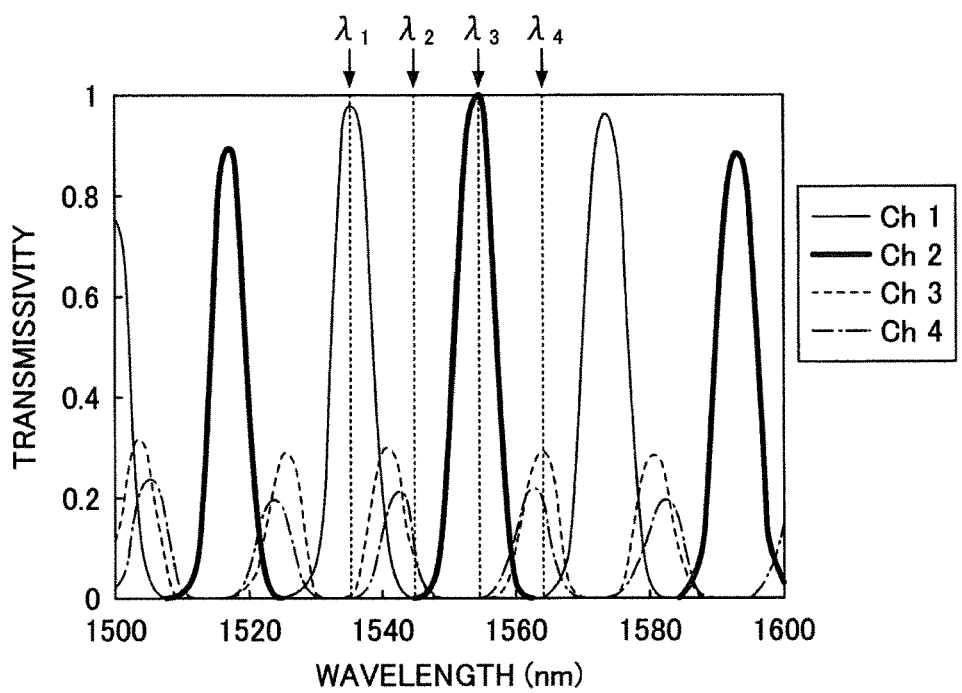
FIG. 14C is a diagram illustrating transmitted spectra at time point C in FIG. 13.

FIG. 14C is a diagram illustrating a transmission spectrum at time point C of FIG. 13. At time point C, the transmission spectrum of λ3 is acquired on channel 2, in addition to λ1 on channel 1.

Figure 14D:
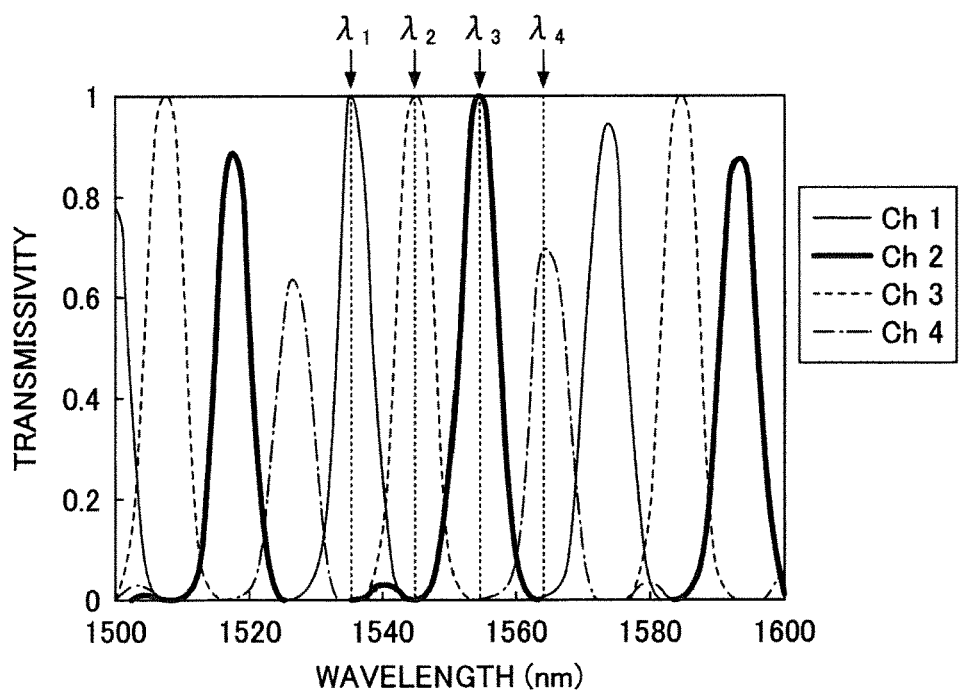
FIG. 14D is a diagram illustrating transmitted spectra at time point D in FIG. 13.

FIG. 14D is a diagram illustrating a transmission spectrum at time point D of FIG. 13. At time point D, the transmission spectrum of λ2 is acquired on channel 3, in addition to λ1 and λ3 on channel 1 and channel 2.

Figure 14E:
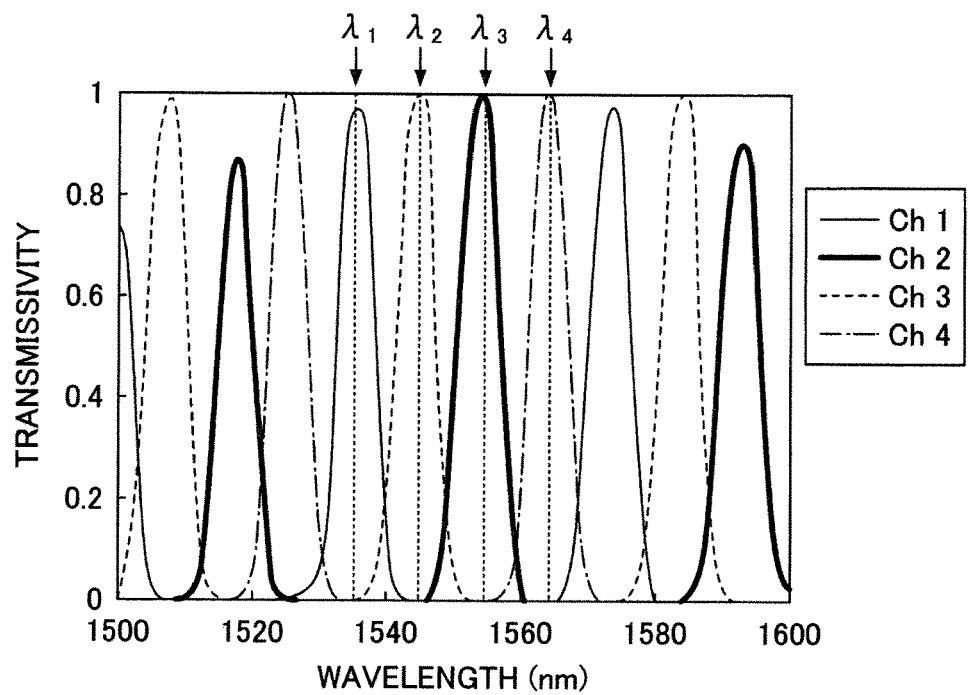
FIG. 14E is a diagram illustrating transmitted spectra at time point E in FIG. 13.

FIG. 14E is a diagram illustrating a transmission spectrum at time point E of FIG. 13. At time point E, the transmission spectrum of λ4 is acquired on channel 4, in addition to λ1, λ2, and λ3 on channels 1, 2 and 3.

Figure 14F:
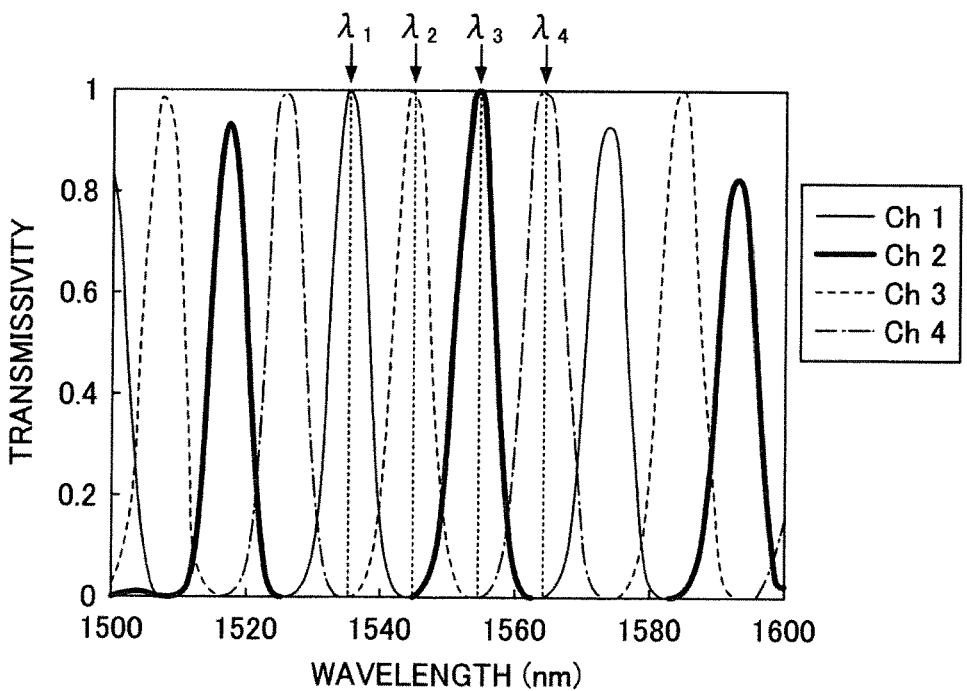
FIG. 14F is a diagram illustrating transmitted spectra at time point F in FIG. 13.

FIG. 14F is a diagram illustrating output waveforms at time point F of FIG. 13. The control on the AMZs for the individual wavelengths have been completed up to time point E, and therefore, there is not much difference between the transmission spectra at time point F and time point E.

The control of step 5 for the entirety of the wavelengths of light is carried out at appropriate timing during the service. Accordingly, the multiplexed wavelengths in WDM signals can be separated at a high signal to noise (S/N) ratio even when the process precision of the optical demultiplexer 1C is insufficient or the refractive index varies due to temperature fluctuation. Accordingly, the manufacturing cost of the optical integrated circuits of the WDM receiving end can be reduced.

The optical demultiplexers 1A to 1C according to the embodiments can be applied to both long-distance and medium-distance optical communications such as core networks or metro networks. The optical demultiplexers of the embodiments are also applicable to short-distance optical communications.

<Applications>

Figure 15:
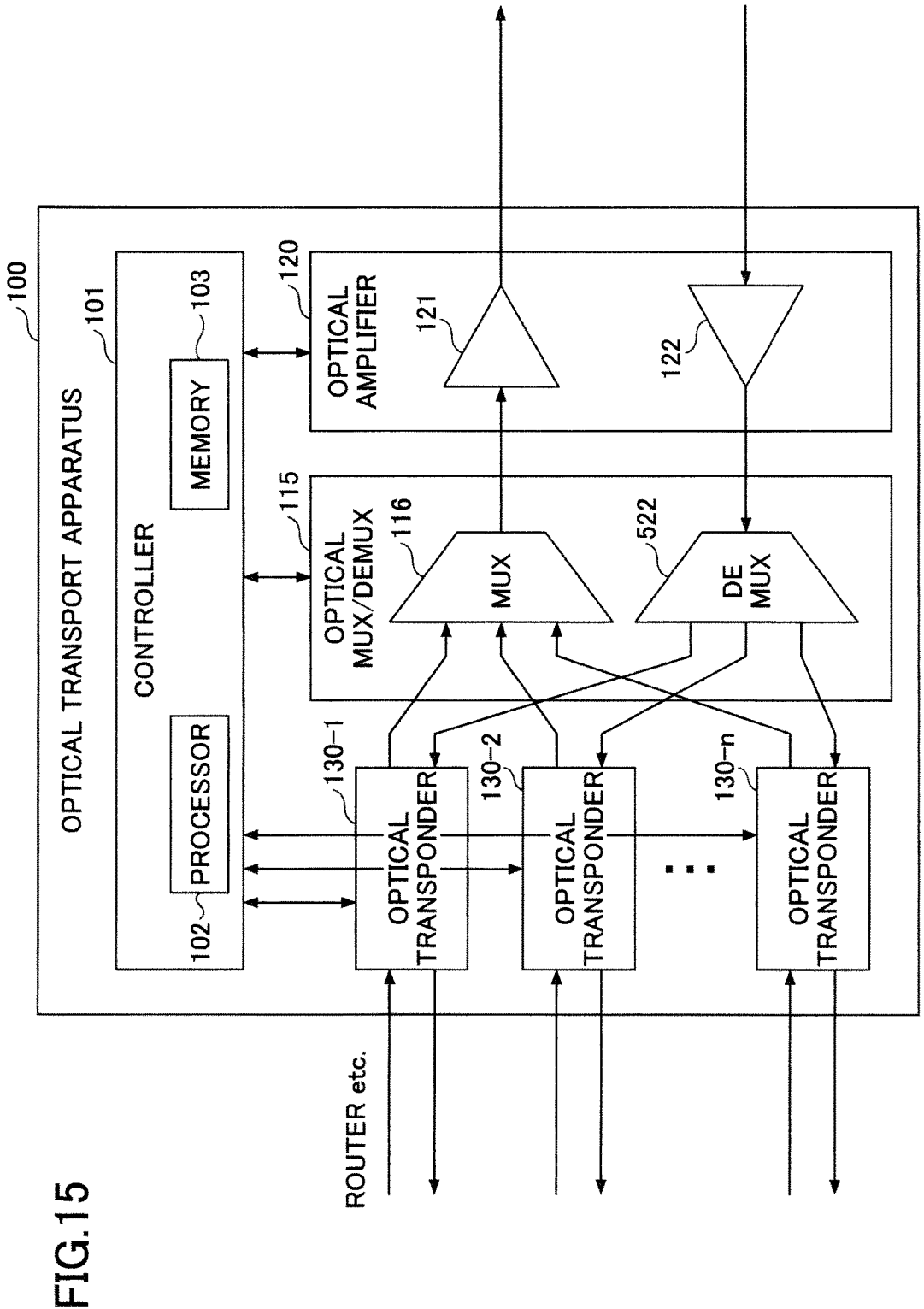
FIG. 15 is a schematic diagram of an optical transport apparatus to which the optical demultiplexer of an embodiment is applied.

FIG. 15 is a schematic diagram of the optical transport apparatus 100 to which the optical demultiplexer of the embodiment is applied. The optical transport device 100 is used as, for example, a network node of a WDM system.

The optical transport apparatus 100 has transponders 130-1 to 130-n (which may be collectively referred to as "transponders 130"), a controller 101, an optical multiplexer/demultiplexer 115, and an optical amplifier 120. The controller 101 includes a processor 102 and a memory 103, and it controls the operations of the transponders 130, the optical multiplexer/demultiplexer 115, and the optical amplifier 120.

Client signals transferred from routing nodes such as optical routers or optical switches (hereinafter collectively referred to as "routers") are subjected to optical wavelength conversion and converted into wavelengths suitable to the optical network by the transmitter sections of the associated transponders 130. The converted signals are multiplexed by the optical multiplexer (denoted as "MUX") 116 of the optical multiplexer/demultiplexer 115, amplified by the optical amplifier 121, and output to the transmission path on the optical network. An optical signal received from the optical network is amplified by the optical amplifier 122, and wavelength-demultiplexed by the optical demultiplexer (denoted as "DEMUX") 110. Any one of the optical demultiplexers 1A to 1C of the above-described embodiments may be used as the optical demultiplexer 110. The optical signal is wavelength-demultiplexed by the optical demultiplexer 110. The signal components of the respective wavelengths are supplied to the receiving ends of the associated transponders 130 and then transmitted to the router side.

In the optical demultiplexer 110, the control circuits 15-1 to 15-3 and the control circuits 16-1 to 16-6 used to control the phase shifters 12 of the AMZs may be realized by a part of the processor 102. The optical demultiplexer 110 can appropriately separate the signal components of the respective wavelengths regardless of variations in production tolerance or the like, based upon the power increase/decrease control described above.

In the exemplified configuration of FIG. 15, the optical signals of the respective wavelengths are added or dropped by the optical transport apparatus 100. However, optical switches may be provided between the optical multiplexer 116 and the optical amplifier 121 and between the optical demultiplexer 522 and the optical amplifier 122 to add, drop, or pass through a desired wavelength.

Figure 16:
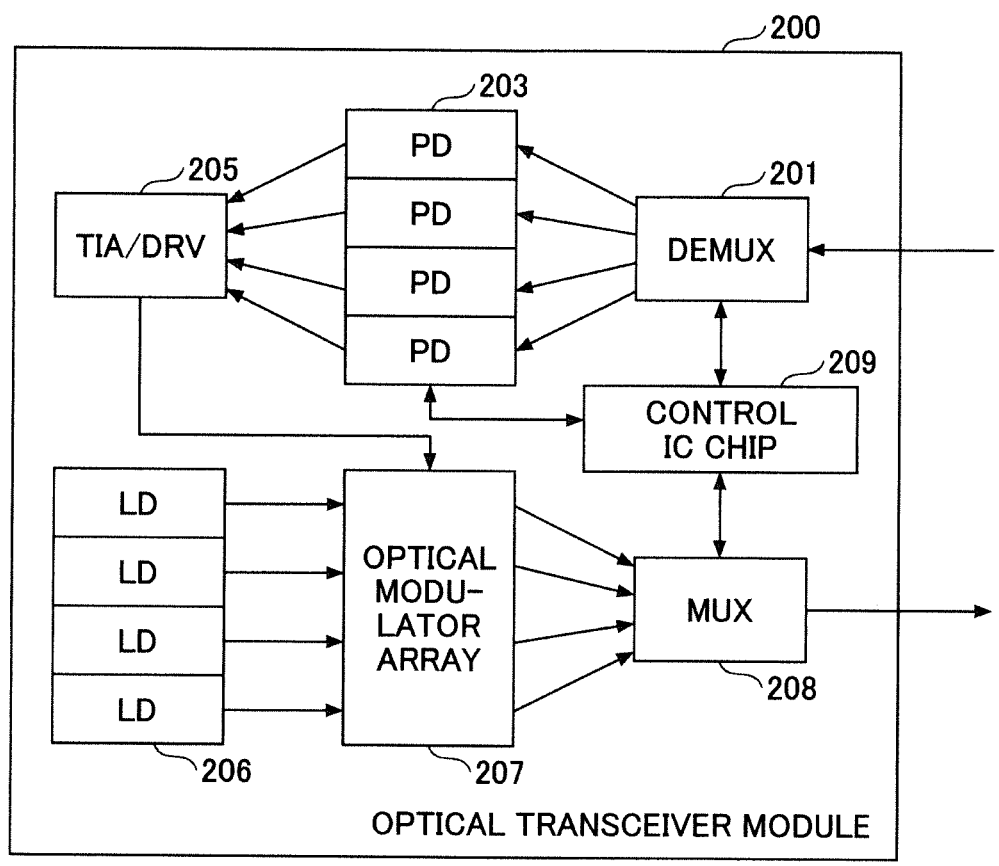
FIG. 16 illustrates an example of an optical transceiver module to which the optical demultiplexer of an embodiment is applied.

FIG. 16 is a schematic diagram of an optical transceiver module 200 as another application. The optical transceiver module 200 is also an example of the optical transport apparatus, which may be used for optical transmission between servers or between LSI-mounted server blades. The optical transceiver module 200 includes an optical demultiplexer (DEMUX) 201, a photodetector (PD) array 203, an electric circuit chip 205, a laser diode (LD) array 206, an optical modulator array 207, an optical multiplexer (MUX) 208, and a control IC chip 209. Any one of the optical demultiplexers 1A to 1C of the embodiments may be used as the optical demultiplexer 201. The control circuits 15-1 to 15-3 and the control circuits 16-1 to 16-6 may be realized by a part of the control IC chip 209.

A received optical signal is separated into light components of the respective wavelengths by the optical demultiplexer (DEMUX) 201, and detected by the associated PDs of the photodetector array 203. The photocurrent output from each PD is converted into an electric signal by a transimpedance amplifier (TIA) of the electric circuit chip 205 and output to an external electronic circuit such as an LSI or a digital signal processor.

The light beams of the respective wavelengths output from the LD array 206 are input to the associated optical modulators of the optical modulator array 207. A set of drivers (DRV) of the electric circuit chip 205 generate high-frequency drive signals based on data signals input externally to modulate the light beam input to each optical modulator of the modulator array 207. The modulated optical signals of the respective wavelengths are multiplexed by the optical multiplexer (MUX) 208 and output to an optical interconnect such as a fiber optic cable.

In the optical transceiver module 200, the optical demultiplexer (DEMUX) 201 is configured to correctly separate and output the respective wavelength components at the associated output ports, regardless of variations in production tolerance, temperature change, or the like. Optical loss or inter-channel crosstalk can be suppressed and accurate wavelength demultiplexing is achieved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority or inferiority of the invention. Although the embodiments of the present inventions have been described in detail, it should be understood that the various changes, substitutions, and alterations could be made hereto without departing from the spirit and scope of the invention.

What is claimed is:

1. An optical transport apparatus used in a wavelength division multiplexing system, comprising:
   an optical demultiplexer that separates a wavelength division multiplexed signal into light components of respective wavelengths,
   wherein the optical demultiplexer has at least one unit circuit formed by three asymmetric Mach-Zehnder interferometers having a same arm length difference,
   wherein the unit circuit has a tree structure in which two output ports of a first asymmetric Mach-Zehnder interferometer are connected to a second asymmetric Mach-Zehnder interferometer and a third asymmetric Mach-Zehnder interferometer, respectively, and
   wherein the unit circuit has
   a first monitor connected to a first output port of the second asymmetric Mach-Zehnder interferometer,
   a second monitor connected to a second output port of the second asymmetric Mach-Zehnder interferometer,
   a third monitor connected to a first output port of the third asymmetric Mach-Zehnder interferometer,
   a fourth monitor connected to a second output port of the third asymmetric Mach-Zehnder interferometer,
   a first control circuit that controls a first transmissivity of the first asymmetric Mach-Zehnder interferometer so as to increase a monitoring result acquired from the second monitor and the fourth monitor,
   a second control circuit that controls a second transmissivity of the second asymmetric Mach-Zehnder interferometer so as to decrease a monitoring result of the first monitor, and
   a third control circuit that controls a third transmissivity of the third asymmetric Mach-Zehnder interferometer so as to decrease a monitoring result of the third monitor, and
   wherein the second output port of the second asymmetric Mach-Zehnder interferometer outputs a first transmission spectrum and the second output port of the third asymmetric Mach-Zehnder interferometer outputs a second transmission spectrum.

2. The optical transport apparatus as claimed in claim 1, wherein the unit circuit has
   a first phase shifter provided to the first asymmetric Mach-Zehnder interferometer,
   a second phase shifter provided to the second asymmetric Mach-Zehnder interferometer, and
   a third phase shifter provided to the third asymmetric Mach-Zehnder interferometer, and
   wherein the first control circuit controls the first phase shifter, the second control circuit controls the second phase shifter, and the third control circuit controls the third phase shifter.

3. The optical transport apparatus as claimed in claim 2, wherein the first control circuit controls the first phase shifter such that a sum of a monitored power level of the second monitor and a monitored power level of the third monitor increases.

4. The optical transport apparatus as claimed in claim 1, wherein the optical demultiplexer has a plurality of unit circuits cascaded in a tournament tree, and
   wherein the arm length difference $\Delta L_m$ of a m-th stage unit circuit is one half of the arm length difference $\Delta L_{m-1}$ of a (m−1)th stage unit circuit.

5. The optical transport apparatus as claimed in claim 1, comprising:
   an optical wavelength filter that separates the wavelength division multiplexed signal into at least two bands, and
   at least two optical demultiplexers connected to outputs from the optical wavelength filter associated with the at least two bands.

6. The optical transport apparatus as claimed in claim 1, comprising:
   a photo detector connected to the second output port of the second asymmetric Mach-Zehnder interferometer and serving as the second monitor, and
   a photo detector connected to the second output port of the third asymmetric Mach-Zehnder interferometer and serving as the fourth monitor.

7. An optical demultiplexer that demultiplexes a light containing a plurality of wavelengths into light components of respective wavelengths, comprising:
   at least one unit circuit formed by three asymmetric Mach-Zehnder interferometers having a same arm length difference,
   wherein the unit circuit has a tree structure in which two output ports of a first asymmetric Mach-Zehnder interferometer are connected to a second asymmetric Mach-Zehnder interferometer and a third asymmetric Mach-Zehnder interferometer, respectively, and wherein the unit circuit has
a first monitor connected to a first output port of the second asymmetric Mach-Zehnder interferometer,
a second monitor connected to a second output port of the second asymmetric Mach-Zehnder interferometer,
a third monitor connected to a first output port of the third asymmetric Mach-Zehnder interferometer,
a fourth monitor connected to a second output port of the third asymmetric Mach-Zehnder interferometer,
a first control circuit that controls a transmissivity of the first asymmetric Mach-Zehnder interferometer so as to increase a monitoring result acquired from the second monitor and the fourth monitor,
a second control circuit that controls a transmissivity of the second asymmetric Mach-Zehnder interferometer so as to decrease a second monitoring result of the first monitor, and
a third control circuit that controls a transmissivity of the third asymmetric Mach-Zehnder interferometer so as to decrease a monitoring result of the third monitor, and
wherein the second output port of the second asymmetric Mach-Zehnder interferometer outputs a first transmission spectrum and the second output port of the third asymmetric Mach-Zehnder interferometer outputs a second transmission spectrum.

8. A method of controlling optical demultiplexing comprising:
inputting a light of a first wavelength of the plurality of wavelengths to an input port of the optical demultiplexer as claimed in claim 7;
controlling a transmission characteristic of asymmetric Mach-Zehnder interferometers positioned between the input port and an output port from which the light of the first wavelength is output;
after stabilization of the first wavelength, selecting sequentially a wavelength to be input to the input port and repeating the controlling of the transmission characteristic and the stabilization;
after the controlling of all the plurality of wavelengths, inputting the plurality of wavelengths all together to the input port; and
controlling all the asymmetric Mach-Zehnder interferometers of the optical demultiplexer simultaneously.

9. The method as claimed in claim 8, comprising:
starting optical communication after the plurality of wavelengths are stabilized.

\* \* \* \* \*